(12) United States Patent
Naganuma et al.

(10) Patent No.: US 11,144,292 B2
(45) Date of Patent: Oct. 12, 2021

(54) PACKAGING SUPPORT SYSTEM AND PACKAGING SUPPORT METHOD

(71) Applicant: HITACHI, LTD., Tokyo (JP)

(72) Inventors: Yuki Naganuma, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/817,823

(22) Filed: Mar. 13, 2020

(65) Prior Publication Data
US 2021/0064351 A1 Mar. 4, 2021

(30) Foreign Application Priority Data

Aug. 30, 2019 (JP) .............................. JP2019-158328

(51) Int. Cl.
*G06F 8/41* (2018.01)
*G06F 8/71* (2018.01)
*G06F 8/38* (2018.01)

(52) U.S. Cl.
CPC ................ *G06F 8/447* (2013.01); *G06F 8/38* (2013.01); *G06F 8/42* (2013.01); *G06F 8/4436* (2013.01); *G06F 8/71* (2013.01)

(58) Field of Classification Search
CPC ... G06F 8/447; G06F 8/38; G06F 8/42; G06F 8/4436; G06F 8/71
See application file for complete search history.

(56) References Cited

U.S. PATENT DOCUMENTS

| 10,791,021 B1 * | 9/2020 | Sharma | H04L 41/0803 |
| 10,884,732 B1 * | 1/2021 | Zolotow | G06F 8/76 |
| 2013/0007216 A1 | 1/2013 | Fries et al. | |
| 2019/0294477 A1 * | 9/2019 | Koppes | G06F 9/5072 |
| 2020/0387357 A1 * | 12/2020 | Mathon | G06F 9/5077 |

FOREIGN PATENT DOCUMENTS

| JP | 2014-523026 A | 9/2014 | |
| WO | WO-2019113216 A1 * | 6/2019 | G06F 3/0482 |

OTHER PUBLICATIONS

Bhattacharjee et al., "A Model-driven Approach to Automate the Deployment and Management of Cloud Services" (Year: 2018).*
Artac et al., "Infrastructure-as-Code for Data-Intensive Architectures: A Model-Driven Development Approach" (Year: 2018).*
John Klein, "Infrastructure as Code-Final Report" (Year: 2018).*

* cited by examiner

*Primary Examiner* — Phillip H Nguyen
(74) *Attorney, Agent, or Firm* — Volpe Koenig

(57) ABSTRACT

A packaging support system capable of easily packaging an IT system is provided. The packaging support system is designed to be provided with: a storage apparatus that stores correspondence relationship information which is associated with identification information capable of identifying a package, identification information capable of identifying a source code on which the package is based, and identification information capable of identifying an instance of the package; and a packaging unit that, on the basis of reception of an instruction to package a specified instance from a terminal operated by a user, acquires a specified source code associated with the specified instance based on the correspondence relationship information from the first management unit and outputs the specified source code.

10 Claims, 18 Drawing Sheets

FIG. 7

| PACKAGE ID | INSTALLER ID | Metadata | | | | | |
|---|---|---|---|---|---|---|---|
| | | Title | Description | Region | Language | Field | ... |
| app1-package | installer/app1 | solution1 | This solve ... | Asia | JP | Industry | ... |
| app2-package | installer/app2 | solution2 | Industry ... | US | English | Industry | ... |
| app3-package | installer/app3 | solution3 | DevOps is ... | Canada | English | Plant | ... |
| ... | ... | ... | ... | ... | ... | ... | ... |

FIG. 8

| INSTANCE ID 801 | PACKAGE ID 802 | Status 803 | UserID 804 | Platform 805 | Credential 806 | Input Values 807 | ... |
|---|---|---|---|---|---|---|---|
| Instance1 | app1-package | Success | User1 | PublicCloud1 | **** | {key1: val1, ...} | ... |
| Instance2 | app1-package | Success | User1 | PrivateCloud 1 | **** | {key1: val2, ...} | ... |
| Instance3 | app2-package | Failed | User2 | PrivateCloud 2 | **** | {key2: val3, ...} | ... |
| Instance4 | app3-package | Success | User3 | PublicCloud2 | **** | {key3: val4, ...} | ... |
| ... | ... | ... | ... | ... | ... | ... | ... |

| INSTANCE ID | PACKAGE ID | SOURCE ID | DiffID | IMAGE CHANGE FLAG |
|---|---|---|---|---|
| Instance1 | app1-package | github.com/org1/pj1.git | diff1 | { appimage/app1: true } |
| Instance2 | app1-package | github.com/org1/pj1.git | diff2 | { appimage/app1: false } |
| Instance3 | app2-package | github.com/org1/pj2.git | diff3 | { appimage/app2: false } |
| Instance4 | app3-package | github.com/org3/pj1.git | diff4 | { appimage/app3: true, appimage/app4: false } |
| ... | ... | ... | ... | ... |

| Priority 1001 | TargetKey 1002 | VALUE CHANGE FLAG 1003 | VARIABLE SETTING FLAG 1004 |
|---|---|---|---|
| 1 | secret | false | false |
| 2 | password | false | false |
| 3 | volume | false | true |
| 4 | ipaddress | false | true |
| ... | ... | ... | ... |
| default | * | true | true |

| DiffID | TargetKeyPath | Before | After |
|---|---|---|---|
| diff1 | spec.resource.request.cpu | 2 | 4 |
| | spec.image | NodeRED:1 | NodeRED:2 |
| | spec.resource.request.memory | - | 2GB |
| | spec.resource.limit.memory | 2GB | - |
| | spec.*.name | default | instance1 |
| | ... | ... | ... |
| diff2 | ... | ... | ... |
| ... | ... | ... | ... |

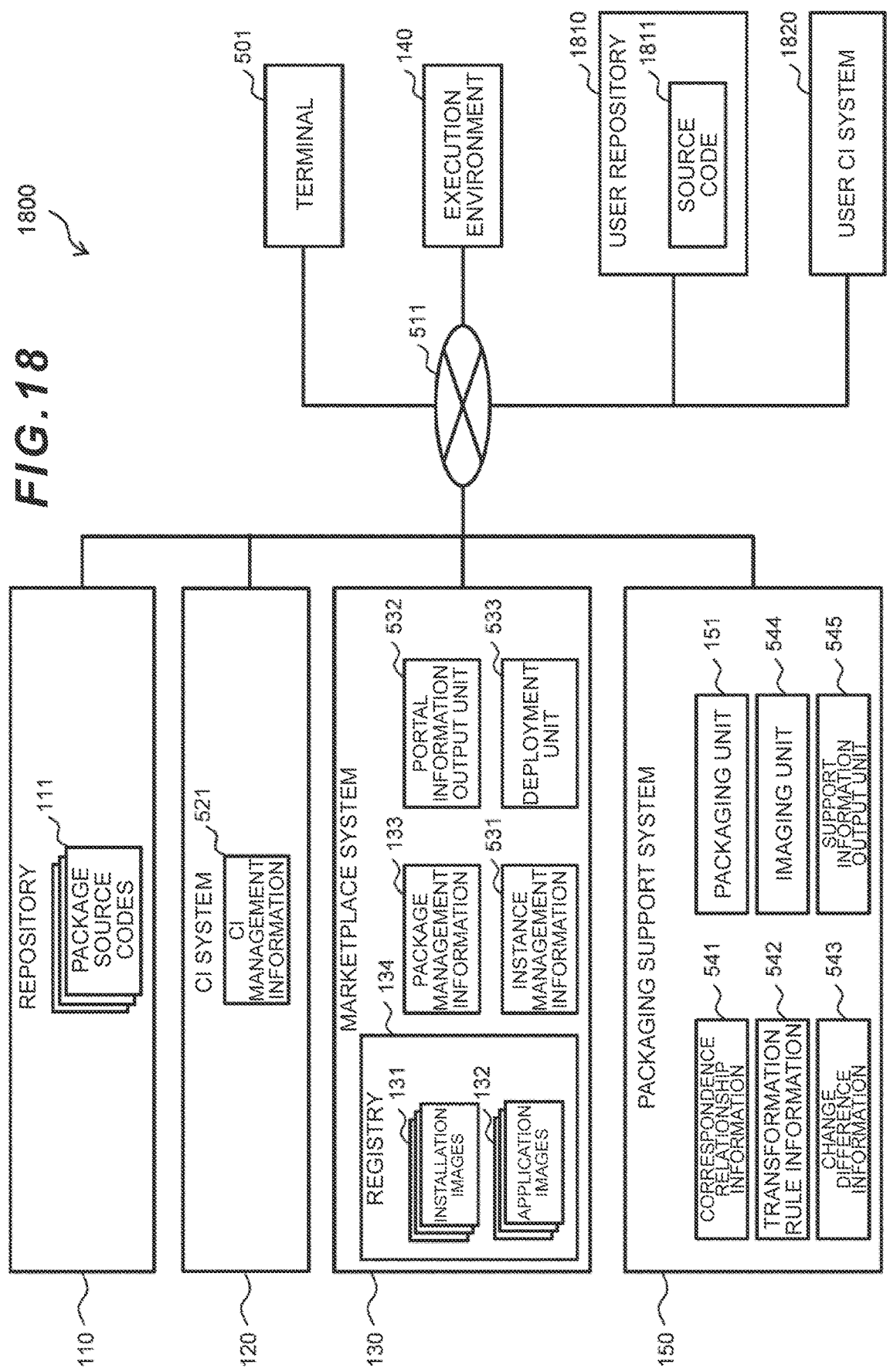

PACKAGING SUPPORT SYSTEM AND PACKAGING SUPPORT METHOD

TECHNICAL FIELD

The present invention relates to a packaging support system and a packaging support method and is suited for use in, for example, a packaging support system and packaging support method for supporting instance packaging.

BACKGROUND ART

In recent years, virtualization of IT (Information Technology) resources has been being promoted. The virtualization technology has been being diversified to implement, for example, a virtual server which is made to look like a plurality of servers obtained by logically dividing a physical server, or a container which is obtained by logically dividing the physical server on the basis of processes of an OS (Operating System) operating on the server and is thereby made to look like one server.

Furthermore, various software has been being developed regarding orchestration tools for effectively managing and operating virtualized IT resources. For example, Open Source Software (OSS) includes OpenStack, Kubernetes, and so on.

As such development in technology has facilitated flexible IT operation, the situation is that there are provided many cloud services for providing users, via a network, with the virtualized IT resources and applications which operate on the IT resources.

As the use of the orchestration tools, the cloud services, and so on has been promoted, IaC (Infrastructure as a Code) which enables the management of the IT resources, services, and so on by means of source codes and the construction and operation of systems operated by the applications has become active as technology to make full use of such orchestration tools, cloud services, and so on.

Examples of package tools for implementing the IaC include Helm (https://helm.sh/) developed as an OSS and Terraform (https://www.terraform.io/) developed as an OSS. Regarding such package tools, a source code for the IaC is generally configured of: a file group of a prototype (template) which describes the configuration of the system; and a variable file which describes a variable(s) and a default value(s) to be assigned to the template.

A marketplace(s) has been, for example, actively provided and used by making use of the IaC technology. The marketplace is designed so that a large number of elements constituting available applications (such as binary data, configuration files, etc. of the relevant applications themselves) which are gathered into one unit (hereinafter referred to as a package(s)) are registered and an intended system can be automatically constructed and used by selecting a package from the registered elements.

Generally, packages are often registered in order for a business operator who develops cloud services, applications, and so on to promote the use of the services, applications, etc. which they provide. Furthermore, an ecosystem in which a plurality of business operators share one marketplace is often formed. On the other hand, users of the marketplace use it in order to save the trouble to construct all the intended systems in many cases. Because of such background, the business operators who register packages are basically different from the users who use them.

In consideration of a life cycle of the registration of a package in the above-described marketplace and the use of the package, there is a possible use case where the user alters the constructed system by selecting a certain package, develops a new system (application), and registers it again as a package in the marketplace. Under this circumstance, the user who wants to newly register the package (a provider of the new package) does not necessarily have knowledge required for the registration of the package. As a result, the provider of the new package, who does not have the knowledge of packaging, needs to learn this knowledge and then examine the new package, so that it takes time and trouble to register the package.

CITATION LIST

Patent Literature

PTL 1: Japanese Unexamined Patent Application Publication (Translation of PCT Application) No. 2014-523026

SUMMARY OF THE INVENTION

Problems to be Solved by the Invention

PTL 1 discloses technology to select an appropriate prototype from predefined static package prototypes on the basis of information of a system constructed by a user and present the selected prototype to the user (that is, a provider of the new package).

However, even if the technology described in PTL 1 is used, the user has no means of knowing information about the package used by the user in the marketplace, that is, the package on which the system that the user wants to register this time is based. As a result, the knowledge for packaging which is included in the original package is not utilized and the user cannot perform packaging of an instance of the application which the user constructed and altered, or it is necessary to examine the packaging again and it thereby takes time to do so.

The present invention was devised in consideration of the above-described circumstances and aims at proposing, for example, a packaging support system capable of easily packaging an instance.

Means to Solve the Problems

In order to solve the above-described problems, provided according to the present invention is a packaging support system capable of communicating with a first management unit that manages one or more source codes, and a marketplace system that manages one or more packages created based on one of the source codes and causes a package, regarding which an instruction is issued from a terminal operated by a user, to be available as an instance in a specified execution environment, wherein the packaging support system is designed to be provided with: a storage apparatus that stores correspondence relationship information which is associated with identification information capable of identifying a package, identification information capable of identifying a source code on which the package is based, and identification information capable of identifying an instance of the package; and a packaging unit that, on the basis of reception of an instruction to package a specified instance from the terminal operated by the user, acquires a specified source code associated with the specified instance based on the correspondence relationship information from the first management unit and outputs the specified source code.

Regarding the above-described configuration, as the user designates an instance which the user desires to package, the source code associated with the instance is output. Therefore, for example, the user can use the output source code, that is, the user no longer needs to identify and acquire the source code by themselves, so that it becomes possible to easily package the instance.

Advantageous Effects of the Invention

Packaging can be supported according to the present invention.

BRIEF DESCRIPTION OF DRAWINGS

FIG. 7 is a diagram illustrating an example of package management information according to the first embodiment;

FIG. 8 is a diagram illustrating an example of instance management information according to the first embodiment;

FIG. 9 is a diagram illustrating an example of correspondence relationship information according to the first embodiment;

FIG. 10 is a diagram illustrating an example of transformation rule information according to the first embodiment;

FIG. 11 is a diagram illustrating an example of change difference information according to the first embodiment;

FIG. 18 is a diagram illustrating an example of the configuration of a packaging support system according to the second embodiment.

DESCRIPTION OF EMBODIMENTS (1) First Embodiment

An embodiment of the present invention will be described below in detail with reference to the drawings. Regarding this embodiment, an explanation will be provided about program development support, particularly the technology to support the development of a method (IaC) for describing the entire IT system as a source code and constructing the system by using the source code. This embodiment is one example and may be applied to elements other than the elements (configuration, targets, usage, and so on) indicated in this embodiment.

Figure 1:
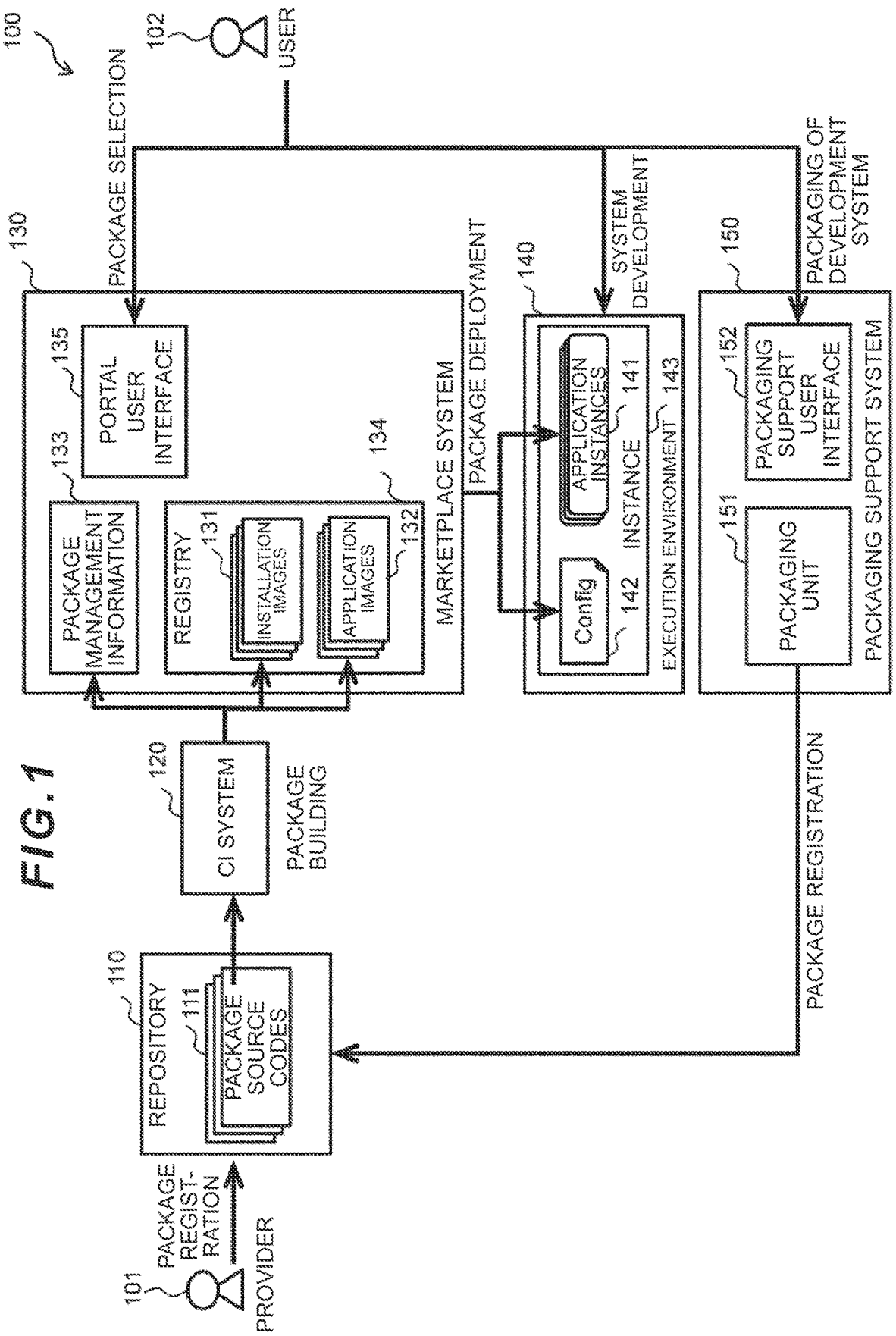
FIG. 1 is a diagram illustrating an example of the configuration of a package system according to a first embodiment.

Referring to FIG. 1, the reference numeral 100 generally indicates a package system according to this embodiment.

FIG. 1 is a diagram illustrating an example of the configuration of the package system 100. The package system 100 is configured by including a repository 110, a CI (Continuous Integration) system 120, a marketplace system 130, an execution environment 140, and a packaging support system 150.

A provider 101 who registers a package(s) in the marketplace system 130 registers a package source code 111, on which the package to be registered in the marketplace system 130 is based, in a designated repository 110. Examples of the repository 110 include GitHub (https://github.com/) as a cloud service and GitLab as OSS. An example of the package source code 111 will be explained later with reference to FIG. 2.

Incidentally, FIG. 1 shows an example in which package source codes 111 for a plurality of packages included in the marketplace system 130 are managed by one repository 110; however, the configuration may be designed so that the repository 110 may be divided for each package source code 111 corresponding to a package.

A package herein used is a unit to be registered in the marketplace system 130 and a system corresponding to the package unit is constructed. Incidentally, the detailed explanation will be provided later, but the package is composed of, for example, various kinds of information for having the marketplace system 130 manage and display the package, entities or references of installation images 131 for constructing the system, and entities or references of application images 132 of an application to be operated on the system.

The registered package source code 111 is used by the CI system 120 to build (or create) a package. Building the package (building processing) means processing for generating, for example, the installation image(s) 131 for executing the installation, the application image(s) 132 of an application instance(s) 141 executed at a virtual server, a container, and so on, and package management information 133 to be displayed and managed by the marketplace system 130.

Examples of the installation images 131 include binary information for executing installation processing, container images for installation defined by CNAB (Cloud Native Application Bundles, https://cnab.io/), some or all of the package source codes 111, information obtained by archiving (compressing) some or all of the package source codes 111 by using, for example, tar, and binary data obtained by compiling the package source codes 111. Similarly, examples of the application images 132 include binary data for executing the application instances 141, virtual server images, and container images. Incidentally, the package management information 133 will be described later with reference to FIG. 7.

The building processing is typically automatically started as triggered by, for example, registration of the package source code 111. In this embodiment, the CI system 120 executes the building processing. Regarding examples of the CI system 120, various resources (such as software and services) such as Jenkins (https://jenkins.io/) and GitLab-CI (https://docs.gitlab.com/ee/ci/) are provided whether with or without consideration. A method for designating the building processing varies depending on the selected resource; and if the CI system 120 has information internally, there may be a case where, for example, the information is included in part of the package source code 111.

The installation images 131, the application images 132, and the package management information 133 which are created by the building processing are registered in a storage apparatus (such as a registry 134) of the marketplace system 130. The registry 134 is described as being included in the marketplace system 130 for the sake of convenience; however, the registry 134 may be provided outside the marketplace system 130. Furthermore, the marketplace system 130 displays a portal user interface 135 on a display device to the user 102 of the marketplace system 130 by using the package management information 133 and so on. An example of the portal user interface 135 will be described later with reference to FIG. 3.

The user 102 selects a package which the user 102 wants to use this time, by using the portal user interface 135. When the user 102 selects the package, the marketplace system 130 executes deployment processing on the execution environment 140 by using the installation image 131 of the selected package. The execution environment 140 is an environment to operate packages. The execution environment 140 is, for example, a cluster of IT resources managed by public cloud services, private cloud services, and orchestration tools such as OpenStack and Kubernetes. Furthermore, the execution environment 140 to operate the package selected by the user 102 may be in a format designated by the user 102 or may be in a format automatically selected by the marketplace system 130. Additionally, the marketplace system 130 is typically shared by a plurality of users 102. Under this circumstance, the execution environment 140 may vary for each user 102 or one execution environment may be shared by the users 102.

As a result of the deployment processing by the marketplace system 130, a system corresponding to the relevant package which is composed of the application instance 141 which is an execution state of the application image 132, a Config 142 which is a configuration file that defines the operation of the application instance 141, and so on (hereinafter referred to as an instance 143) is constructed in the execution environment 140. Under this circumstance, there may be one or more application instances 141 according to descriptions of the Config 142.

Then, the user 102 adds necessary changes to the constructed instance 143 and performs development which suits the use intended by the user 102 (changes to the instance 143). The user 102 who has successfully developed what can be registered again as a package performs packaging of the developed IT system (for example, the instance 143) by using the packaging support system 150.

The packaging support system 150: includes a packaging unit 151 and a packaging support user interface 152 which accepts input/output from the user 102; and supports, for example, registration of a package of the instance 143 developed by the user 102.

Incidentally, in the following drawings and explanation, the explanation will be provided by taking Kubernetes as an example of the execution environment 140, Helm as an example of the deployment processing, and a container image in accordance with CNAB including Helm as an example of the installation image 131. However, this embodiment is not limited to the above-described configuration. For example, a combination of IaaS (Infrastructure as a Service), which is a public cloud service, as the execution environment 140, a virtual server instead of a container as a target to be constructed in the execution environment 140, and Terraform as deployment processing may be adopted.

Figure 2:
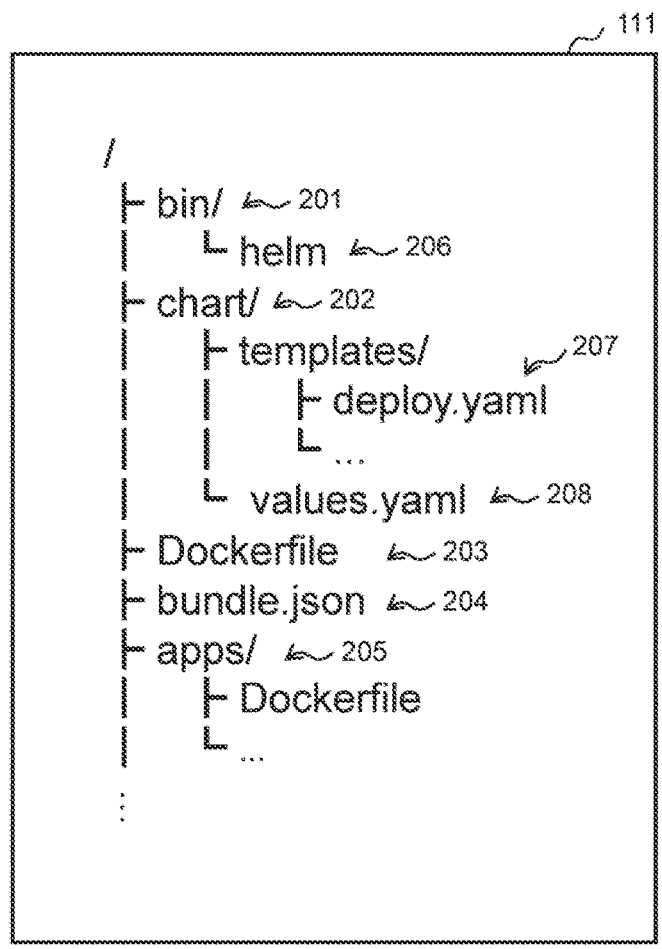
FIG. 2 is a diagram illustrating an example of a directory configuration of a package source code according to the first embodiment.

FIG. 2 is a diagram illustrating an example of a directory configuration of the package source code 111. This example is designed to create an installation image 131 by a container and an application image 132 as the container including an application instance 141.

The package source code 111 includes, for example, a bin directory 201 which stores tools for executing actual deployment processing on the execution environment 140, a chart directory 202 which is a prototype file group for creating a Config 142, a Dockerfile 203 for creating the installation image 131, data for creating the package management information 133, a bundle.json 204 which describes metadata, etc., and an apps directory 205 which stores a file group for creating the application image 132.

The CI system 120 executes the building processing by using the package source code 111. More specifically, upon creation of the installation image 131, a container image including a helm command 206, which is a tool for executing the actual deployment processing on the execution environment 140, a chart directory 202, and so on is created. In this case, the actual deployment processing is performed by executing the helm command 206 along with the chart directory 202 via the execution of the container image. The chart directory 202 includes, for example, a prototype file group (whose one example is a deploy.yaml 207) and a variable file (whose one example is a values.yaml 208) for designating a variable to be assigned to the prototype file group and a default value of the variable. The deploy.yaml 207 and the values.yaml 208 will be described later with reference to FIG. 4. Furthermore, the application image 132 is also created in the same manner by using, for example, information of the apps directory 205.

The entire chart directory 202 which is the prototype file group will be hereinafter referred to as template information and a prototype file such as the deploy.yaml 207 will be hereinafter referred to as a template file, and a file including the variable and the default value such as the values.yaml 208 will be hereinafter referred to as a variable file.

Figure 3:
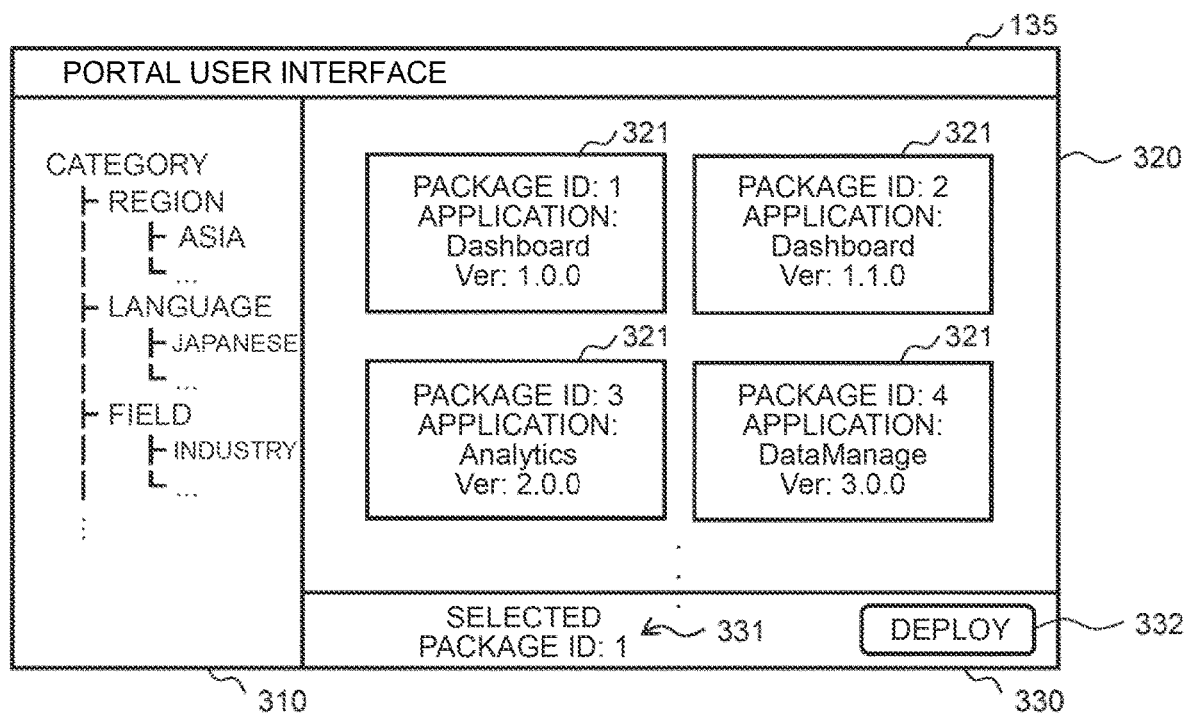
FIG. 3 is a diagram illustrating an example of a portal user interface according to the first embodiment.

FIG. 3 is a diagram illustrating an example of the portal user interface 135.

The portal user interface 135 shows a screen used by the user 102 to select a package on which the deployment processing is to be executed. Besides this, the portal user interface 135 may include, for example, information of the instance 143 constructed by the deployment processing and a screen for managing the information.

When selecting a package on the portal user interface 135, the portal user interface 135 includes, for example, a pane 310 which displays keywords for filtering packages, a pane 320 which displays a list of packages, and a pane 330 for displaying information 331 of the selected package and a deploy button 332 for executing the deployment processing. A package display 321 indicating one package displays an identifier of the package, a name of the package, a version of the package, and so on. Furthermore, the portal user interface 135 may be equipped with a function that displays detailed information on another screen, for example, information such as a further detailed explanation, how to use it, cautions to take when using it, and contact information, by pressing the package display 321.

Figure 4:
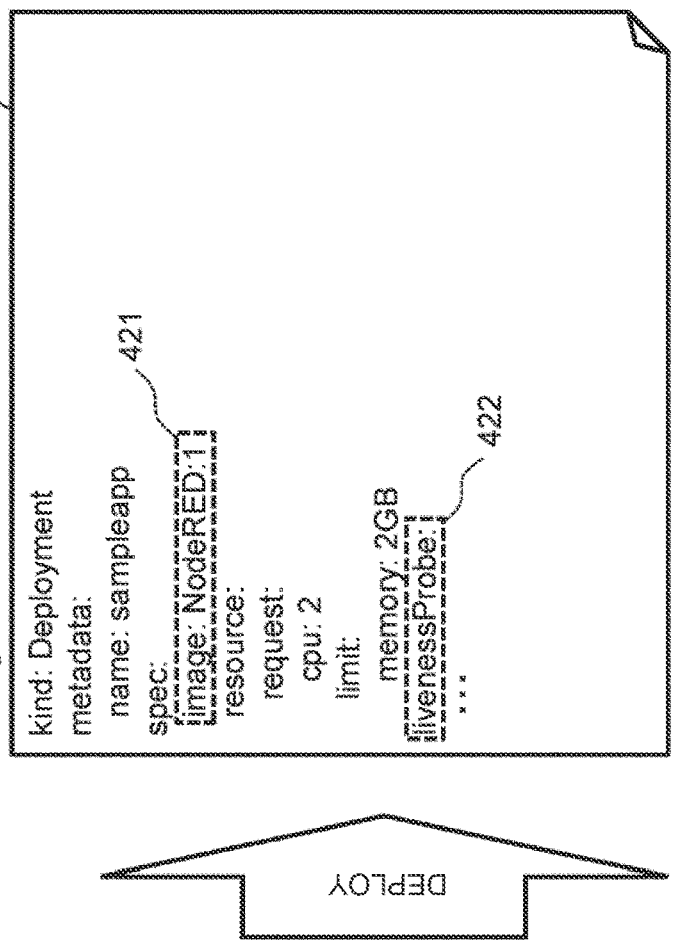
FIG. 4 is a diagram illustrating an example of data relating to deployment processing according to the first embodiment.

FIG. 4 is a diagram illustrating an example of data relating to the deployment processing. The relationship between the template information included in the installation image 131

(such as the deploy.yaml 207 and the values.yaml 208) and the Config 142 generated from the template information by the deployment processing will be explained with reference to FIG. 4.

The template information generally includes a template file group such as the deploy.yaml 207, which is a prototype of the Config 142, and a variable file in a format like that of the values.yaml 208 which defiles a variable to be assigned to the prototype of the Config 142 and a default value of the variable.

For example, a description 401 ("image:{{.Values.image}}") means to read a description 411 ("image:NodeRED: 1") defined in the values.yaml 208. For example, "image:" (particularly, image) of "image:{{.Values.image}}" will be hereinafter referred to as a key and the "{{.Values.image}}" part will be hereinafter referred to as a value. Particularly, when the value for the key is variable as described above (it is described with {{ }} in this example), this will be called as "variable setting" (of the key). Furthermore, for example, ".Values." of "{{.Values.image}}" which indicates the variable setting is a prefix indicating that a reference is made to the key described in the variable file and the "image" which is the expression capable of identifying a default value (the part to be read) of the variable in the variable file will be called a variable key (variable identifier).

Then, if a value is not designated for the variable of the variable key "image" upon the deployment processing, "NodeRED:1" which is a default value is used; and in this case, a description 421 of the Config 142 is generated. Incidentally, if another value, for example, the value "FlowEditor: 1" is designated for the variable of the variable key "image" upon the deployment processing, the description 421 is generated as "image: FlowEditor: 1".

Furthermore, the template file may include a programmatic element such as an element like the description 402 (for example, an "if" sentence). Consequently, control can be made so that: when a description 412 which is the corresponding variable is "true," a description like a description 422 appears in the Config 142; and contrarily when the description 412 is "false," the description 422 does not appear in the Config 142.

The Config 142 which defines, for example, the operation of the application instance 141 is generated in the above-described manner. Generally, the Config 142 is often expressed in a hierarchical structure associated with the concept of the operation to be expressed. For example, "image: NodeRED: 1" means that it is one of elements of an object which has "spec" as its parent. By using this feature, a specific element can be uniquely expressed by connecting tiers from a root by using ".". When this expression is used, the description 421 is expressed as "spec.image: NodeRED: 1". If there are a plurality of template files (if files other than the deploy.yaml 207 exist), it is possible to deal with the situation by, for example, adding a file name at the beginning.

The above information has been expressed in the form called YAML using the key(s) and the value(s) in accordance with the helm style; however, another format other than YAML, for example, JSON may also be used. Regarding the key(s) and the value(s) under this circumstance, for example, "image" and "spec.image" are the keys and "NodeRED:1" is the value in the example of the description 421.

Figure 5:
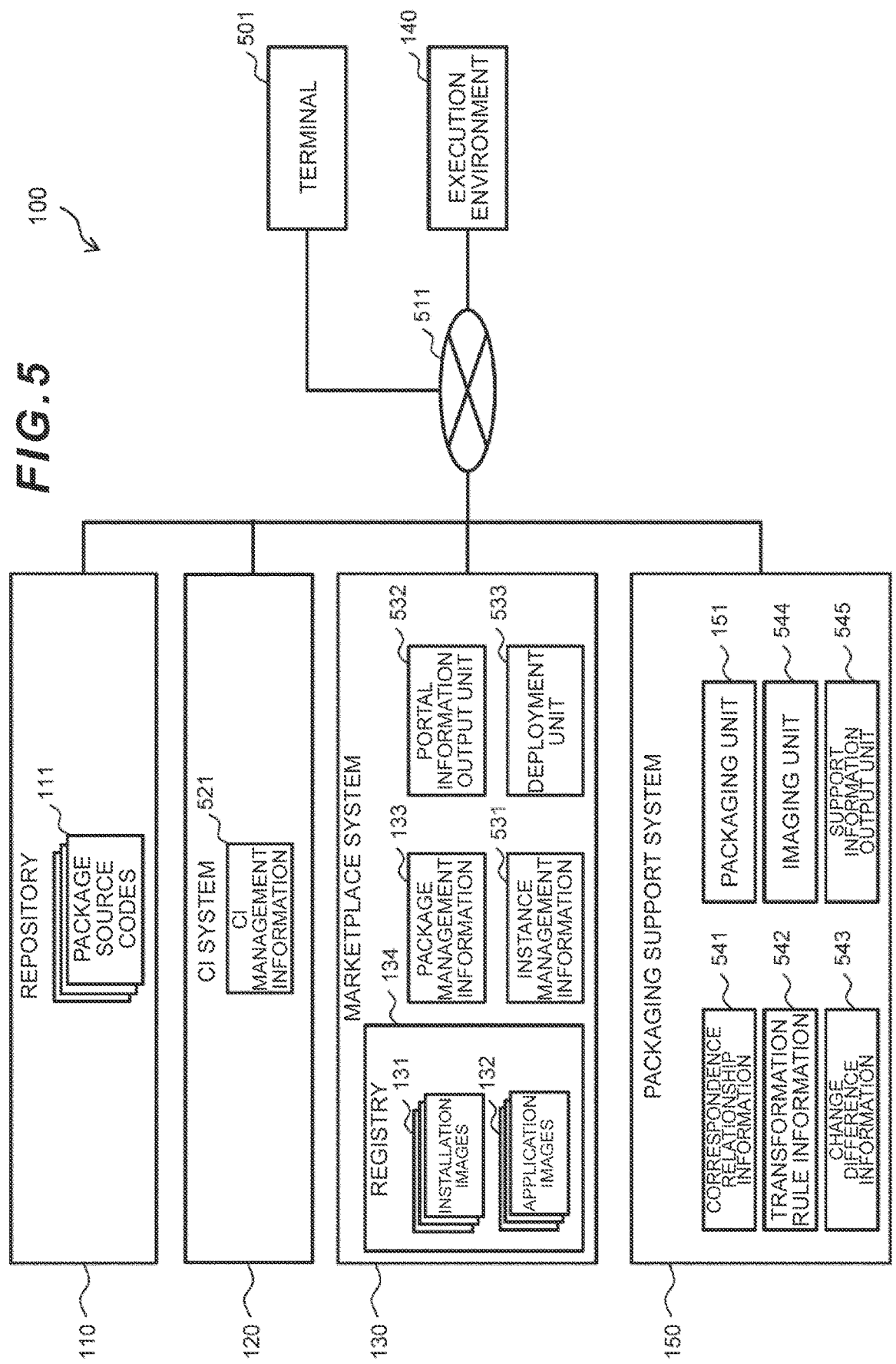
FIG. 5 is a diagram illustrating an example of the configuration of a packaging support system according to the first embodiment.

FIG. 5 is a diagram illustrating an example of the configuration of the packaging support system 150.

The respective constituent elements which are the repository 110, the CI system 120, the marketplace system 130, the execution environment 140, the packaging support system 150, and a terminal 501 used by a developer (for example, the user 102) for the development, etc. are connected via a network 511 as illustrated in FIG. 5 so that they can communicate with each other.

The respective constituent elements operate (or function) on a computer equipped with a CPU (Central Processing Unit), a memory, hard disks, and so on. The respective constituent elements may operate on physically different computers or a physical computer called a virtual server may be operated in units of logically divided computers. Furthermore, each constituent element may operate in units of tasks (which may be also called processes or containers) executed on one computer or a cluster of a plurality of computers.

Furthermore, the network 511 may be a virtual network represented by, for example, the Internet, a local area network (LAN), a private communication network, and a VLAN (Virtual Local Area Network). Typically, regarding the network between the respective constituent elements, the terminal 501, and the execution environment 140, network segments vary depending on differences between users 102 who use the network and the network is logically communication-controlled with a firewall and so on. Furthermore, the terminal 501 and the execution environment 140 may be different from each other like a computer which the user 102 has at hand versus a public cloud service.

The repository 110 stores one or more package source codes 111. If the repository 110 has enough information to add the installation images 131, the application images 132, and the package management information 133 to the marketplace system 130, it may be composed of a plurality of repositories 110. Furthermore, regarding the package source code 111, the source code may be divided in a plurality of units, for example, in units of constituent elements which are the installation images 131, the application images 132, and the package management information 133.

The CI system 120 builds a package source code 111 by using CI management information 521, registers the installation image 131 and the application image 132 in the marketplace system 130, and adds package information to the package management information 133. Incidentally, in this embodiment, the CI system 120 is not indispensable and the package system 100 may be formed so that a human may perform manual operations to execute the building processing and register various kinds of information in the marketplace system 130 and register the CI management information 521 in a database or the like.

The marketplace system 130 includes: the registry 134 which stores the installation images 131 and the application images 132; the package management information 133; an instance management information 531; a portal information output unit 532; and a deployment unit 533.

The various kinds of information such as the installation images 131, the application images 132, the package management information 133, and the instance management information 531, programs for implementing the portal information output unit 532 and the deployment unit 533, and so on are stored in one or more storage apparatuses which are not shown in the drawing.

Incidentally, the functions of the marketplace system 130 (such as the portal information output unit 532 and the deployment unit 533) may be implemented by, for example, the CPU reading programs onto the memory and executing the programs (software), or may be implemented by hardware such as private circuits, or may be implemented by a combination of the software and the hardware.

The portal information output unit 532 displays the portal user interface 135 on the terminal 501 or a display device which is omitted in the illustration of the drawing and executes processing for issuing instructions to, for example, the deployment unit 533. The deployment unit 533 receives the instructions from the portal information output unit 532 and executes the deployment processing on the execution environment 140. The processing of the deployment unit 533 will be described later. The package management information 133 retains information to be displayed on the portal user interface 135 and information to be used by the deployment unit 533. The instance management information 531 is information for managing packages and entities (the instances 143) to be actually operated in the execution environment 140 where the packages are deployed. Incidentally, the instance management information 531 will be described later with reference to FIG. 9.

The registry 134 stores the installation images 131 and the application images 132. It is described that there is one registry 134 for the sake of convenience; however, if the registry 134 is connected to the package management information 133, there may be a plurality of registries 134. Examples of the registry 134 include: container registries represented by, for example, DockerRegistry if each one of the installation images 131 and the application images 132 is a container image; and various types of registries having a function that distribute binary data if each one of the installation images 131 and the application images 132 is the binary data. Furthermore, in a case where a plurality of different kinds of images (for example, the binary data and the containers) coexist, the registry 134 may be composed of a plurality of different kinds of registries 134. Moreover, the registry 134 may be, for example, a storage apparatus(es) such as an object storage apparatus(es) which can be used via a network.

The execution environment 140 is the environment where the instance 143 of the package on which the deployment processing has been executed operates. The execution environment 140 may be, for example, a cloud service or a cluster of physical servers, or so on. Furthermore, it is described that there is one execution environment 140 for the sake of convenience; however, a plurality of different environments (for example, the environment where a virtual server operates, and a service called SaaS [Software as a Service] for providing applications in a cloud style) may coexist depending on the package.

The packaging support system 150 includes correspondence relationship information 541, transformation rule information 542, change difference information 543, a packaging unit 151, an imaging unit 544, and a support information output unit 545 for displaying a development support screen for the user 102.

Various kinds of information such as the correspondence relationship information 541, the transformation rule information 542, and the change difference information 543 and programs for implementing the packaging unit 151, the imaging unit 544, the support information output unit 545, and so on are stored in one or more storage apparatuses which are omitted in the illustration of the drawing.

Incidentally, the functions of the packaging support system 150 (such as the packaging unit 151, the imaging unit 544, and the support information output unit 545) may be implemented by, for example, the CPU reading the programs onto the memory and executing the programs (software), or may be implemented by hardware such as private circuits, or may be implemented by a combination of the software and the hardware. Additionally, the details of the respective constituent elements of the packaging support system 150 will be described later.

The terminal 501 is a work terminal used by the user 102 to select a package by using the marketplace system 130, issue an instruction to execute the deployment processing, manage the instance 143 of the package on which the deployment processing has been executed, change (or develop) the instance 143, and create a package by using the packaging support system 150.

Incidentally, the screen provided by the portal information output unit 532, the screen provided by the support information output unit 545, and so on may be formed so that, for example, the relevant screen is accessed and used by the terminal 501 via a browser. Besides this, the portal information output unit 532 and the support information output unit 545 may be designed so that they provide an API (Application Program Interface) and a program for executing drawing processing is downloaded and installed in the terminal 501 in advance and is then used after settings are set. Furthermore, if, for example, the execution environment 140 is equipped with functions equivalent to those of the terminal 501, the terminal 501 may not be included as a constituent element.

Figure 6:
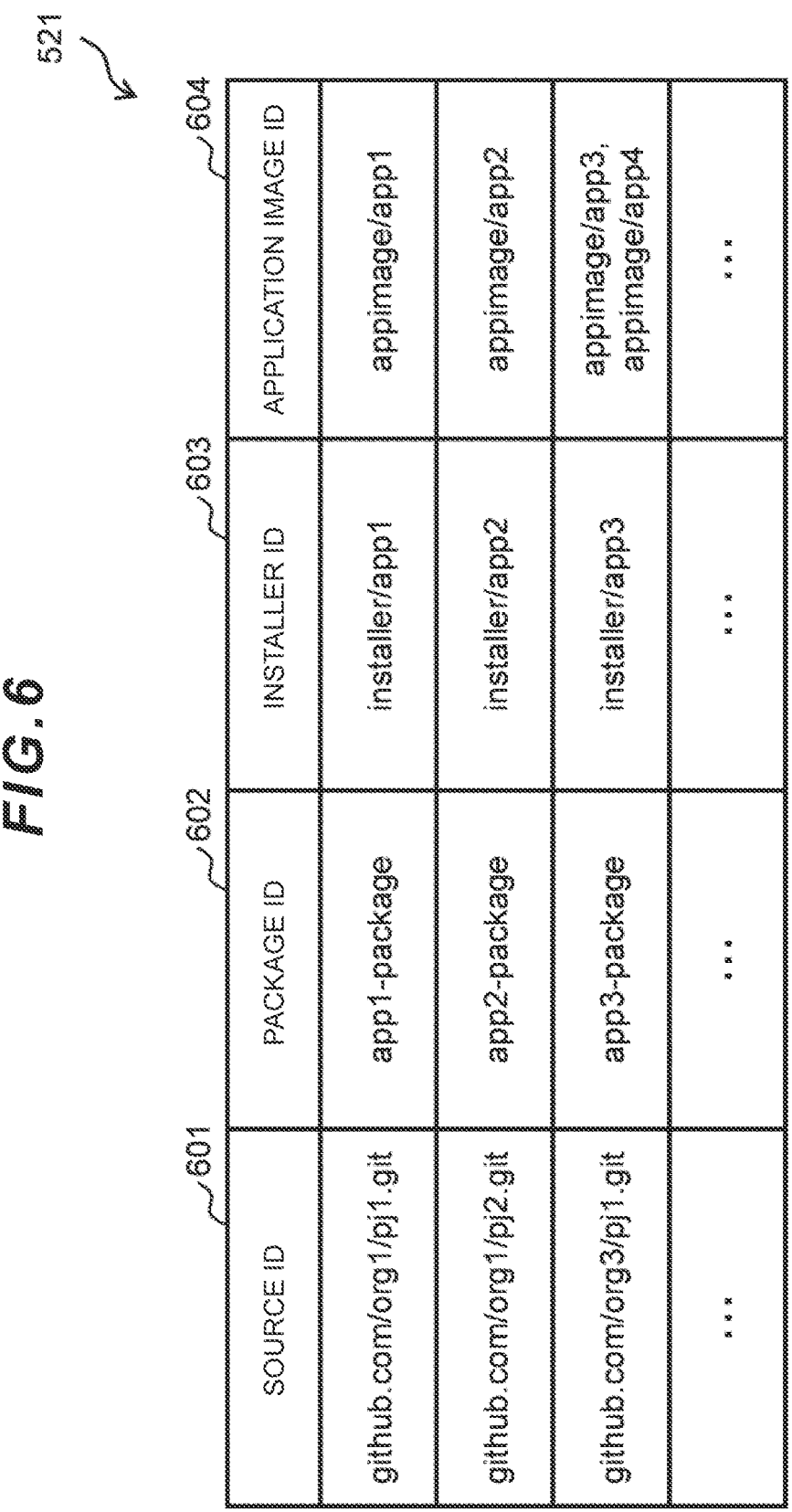
FIG. 6 is a diagram illustrating an example of CI management information according to the first embodiment.

FIG. 6 is a diagram illustrating an example of the CI management information 521.

The CI management information 521 retains information such as: a source ID 601 which is an identifier for uniquely identifying a package source code 111; a package ID 602 which is an identifier for uniquely identifying a package; an installer ID 603 which is an identifier for uniquely identifying an installation image 131; and an application image ID 604 which is an identifier for uniquely identifying an application image 132.

The source ID 601 is, for example, a URL (Uniform Resource Locator) in the repository 110 in which the package source code 111 is stored. The package ID 602 is a common identifier with the package management information 133 and an identifier for uniquely identifying the relevant package. The package ID 602 may be designed in such a manner that the package ID 602 may be issued by the CI system 120, or it may be issued by the marketplace system 130, or the issuance of the package ID 602 may be designated by the provider 101. The installer ID 603 is an ID for identifying the relevant installer and is, for example, a URL which is the location where the installation image 131 is stored. If the installation image 131 is a container image for installation, the installer ID 603 is tag information (for example, registry-url/pathto/image:tag) such as a path and version in the registry 134 where the relevant container image is stored, a hash value for identifying the container image, and so on. The application image ID 604 is similarly, for example, a URL to the relevant application image 132.

Regarding the relationship of the ID group (the source ID 601, the package ID 602, the installer ID 603, and the application image ID 604), the package ID 602 may be set as the main key (for one package) and there may be one or more ID's regarding each of the source ID 601, the installer ID 603, and the application image ID 604. Furthermore, the application image ID 604 may be designed in such a manner that the application image ID 604 is not included directly in the CI management information 521, but is included in the installation image 131 indicated by the installer ID 603.

FIG. 7 is a diagram illustrating an example of the package management information 133.

The package management information 133 retains information of: a package ID 701 which has the same meaning as that of the package ID 602 included in the CI management information 521; and an installer ID 702 which has the same meaning as that of the installer ID 603.

Furthermore, the package management information 133 retains information of metadata 703 (Metadata) including information for management of the marketplace system 130 and information to be displayed on the portal user interface 135. For example, the metadata 703 includes, for example, a title 704 (Title) to be displayed on the portal user interface 135, a description 705 (Description), and other information for controlling, for example, whether or not to display the relevant package according to attributes of the user 102, such as an area 706 (Region) where the relevant package can be used, a language 707 (Language) which can be used, a field 708 (Field) where the use of the package is assumed, and a country where the package can be used. It is assumed that the metadata 703 is input by the provider 101; and the metadata 703 is typically included in information of the corresponding package source code 111. Besides this, the metadata 703 may be designed in such a manner that: the user 101 may input the metadata 703 by using the marketplace system 130; and regarding information which can be estimated, the metadata 703 may be complemented in the CI system 120 and the marketplace system 130.

Incidentally, there may be a plurality of installer ID's 702 for one package ID 701; and if there is the execution order of the corresponding installation images 131, information of the execution order may be included. Furthermore, if there is a parameter to be designated as a standard upon installation as the marketplace system 130 (for example, a URL or the like of the registry 134 in which an application image 132 to be used as a standard is stored), that value may be retained in the package management information 133.

FIG. 8 is a diagram illustrating an example of the instance management information 531.

The instance management information 531 retains information such as: an instance ID 801 for uniquely identifying an entity (the instance 143) of a package on which the deployment processing has been executed in the execution environment 140; a package ID 802 for identifying the package on which the deployment processing has been executed; a status 803 (Status) which is information of the result of the deployment processing, for example, whether a success or a failure; a user ID 804 (User ID) for uniquely identifying the user 102 who executes the deployment processing and manages the deployment processing; a platform 805 (Platform) which is information for identifying the execution environment 140; a credential 806 (Credential) which is credential information for accessing the platform 805; and input values 807 (Input Values: default values) which are input by the user 102 during the deployment processing and set to the installation image 131.

The instance ID 801 is to uniquely identify and manage the entity of the package on which the deployment processing has been executed in the marketplace system 130; and the instance ID 801 is, for example, automatically issued by the marketplace system 130. The instance ID 801 can be generated with, for example, a UUID (Universal Unique Identifier), the package ID, and a serial number by which uniqueness is secured. The user ID 804 is to uniquely identify the user 102 and is input, for example, when logging into the portal user interface 135.

Furthermore, since the actual deployment processing requires the platform 805 which is information (such as an access destination) of the execution environment 140 that is a deployment destination, and the credential 806 which is information (such as an access key, a secret key, and a password) for accessing the platform 805, the instance management information 531 retains such information. Regarding the user ID 804, the platform 805, and the credential 806, when the user 102 prepares the execution environment 140, the marketplace system 130 can acquire these pieces of information by accepting inputs from the portal user interface 135 during the deployment processing.

Furthermore, when the marketplace system 130 itself prepares the execution environment 140, the marketplace system 130 itself can complement the information of the platform 805 and the credential 806 during the deployment processing. Incidentally, since the credential 806 is confidential information, some kind of encryption processing or the like is typically applied to it. Moreover, the input values 807 is a set of values changed from the default values of the variable file like the values.yaml 208. Incidentally, the deployment processing using the instance management information 531 will be explained with reference to a flowchart described later.

FIG. 9 is a diagram illustrating an example of the correspondence relationship information 541.

The correspondence relationship information 541 retains information such as an instance ID 901, a package ID 902, a source ID 903, a difference ID 904 (Diff ID), and an image change flag 905.

The instance ID 901, the package ID 902, and the source ID 903 have the same meanings as those of the ID's with the same names of, for example, the CI management information 521 and the package management information 133 and are generated by combining the information of the CI management information 521 and the package management information 133.

The difference ID 904 and the image change flag 905 are information about a change(s) made by the user 102 to the instance 143 on which the deployment processing was executed. The difference ID 904 is an identifier for uniquely identifying the content of a change made by the user 102 to the Config 142. The content indicated by the difference ID 904 will be described later with reference to FIG. 11.

Moreover, the image change flag 905 is information for judging whether or not any change has been made to the application image 132 of the application instance 141 on which the deployment processing was executed and which operates in the execution environment 140. If there has been any change, the image change flag 905 manages it as "true"; and if no change has been made, the image change flag 905 manages it as "false." Under this circumstance, the image change flag 905 is flag information for judging whether or not any change has been made to the application instance 141 from the application image 132 which served as the base. Examples of the change to the application image 132 include a change of the settings using an interface included in the application instance 141, a change of the configuration file, and patch application to the binary data included in the application instance 141.

When the developed instance 143 is to be packaged, the image change flag 905 is required because there are many cases where the change to the application image 132 which served as the base needs to be also reflected in the newly created package. So, the above-described need is dealt with by setting the application instance 141, which is currently moving in the execution environment 140, as a new application image 132 and including it in the new package.

Incidentally, the setting (value) of the image change flag 905 may be, for example, acquired by the user 102 inputting it when using the packaging support system 150, or may be automatically determined from the difference from the application image 132 which served as the base, or may be determined from an operation log by the user to the application instance 141. Moreover, if the instance 143 is composed of a plurality of application images 132, the image change flag 905 may be designed in such a manner that whether any change has been made or not is described for each application image 132. Generation and use of the correspondence relationship information 541 will be described later with reference to a flowchart.

FIG. 10 is a diagram illustrating an example of the transformation rule information 542.

The transformation rule information 542 retains information such as: a priority 1001 (Priority) which means the priority; a target key 1002 (Target Key) which means the target key of transformation rules; and a value change flag 1003 and a variable setting flag 1004 as flag information for branching the process to be dealt with. The transformation rule information 542 defines how the change should be made when packaging, for example, the Config 142 of the instance 143 which operates in the execution environment 140; and one row of the transformation rule information 542 represents one change rule.

The priority 1001 is priority information and means the priority to be applied; and "1" is the highest priority in this example and a larger number means a lower priority. Moreover, the concept of a "default" which means information that is not defined in the transformation rule information 542 may be included at the end.

The target key 1002 (Target Key) corresponds to the key included in the Config 142 (for example, "image" in the description 421). Incidentally, only the key is solely described in this example; however, a description by regular expressions or a description including the hierarchical structure (for example, "spec.image" in the description 421) may be used as descriptions other than the above description.

The value change flag 1003 and the variable setting flag 1004 are flags for controlling how the change should be made when generating the template information of a new package from the template information of the package on which the Config 142 was based. A specific method of using the flags will be described later with reference to a flowchart; however, these flags are information for judging whether the variable setting should be set according to characteristics of the key and whether the value of the current instance 143 should be adopted or not.

For example, it is assumed that the above-described information is used in cases as described below. When the key like "secret" or "password" corresponds to information which is inherent to each instance 143 and should be confidential, and if no change is made to the original package (if the value change flag 1003 is "false"), and if it is not described in the variable file, but is directly described in the template file (for example, if it is described in the deploy.yaml 207), processing for not treating it as a variable again for the next package (the variable setting flag 1004 is also "false") is to be executed. Besides this, if the variable setting is not set for the key although the key like "volume" or "ipaddress" is inherent to the instance 143 (that is, it changes for every instance 143), the variable setting should be set in some cases. In this case, the value of the instance 143 is not useful, so that the value change flag 1003 is expressed as "false" and the variable setting flag 1004 is expressed as "true."

The transformation rule information 542 is defined by, for example, the provider 101 or an administrator of the marketplace system 130 and the packaging support system 150 in advance before the user 102 uses the packaging support system 150.

FIG. 11 is a diagram illustrating an example of the change difference information 543.

The change difference information 543 retains information such as: a difference ID 1101 (Diff ID) which is an identifier associated with the difference ID 904 of the correspondence relationship information 541; a target key path 1102 (Target Key Path) which is information for identifying a value of the key for the Config 142; a pre-change 1103 (Before) which is a value before the change; and a post-change 1104 (After) which is a value of after the change (that is, at the time of starting packaging). The pre-change 1103 and the post-change 1104 are retained for every target key path 1102.

For example, FIG. 11 shows that the value identified as "spec.resource.request.cpu" in the Config 142 was changed by the user 102 from "2" to "4." Moreover, it is shown that "–" in the pre-change 1103 means an addition was made by, for example, the user 102; and similarly, "–" in the post-change 1104 means that a deletion was made by, for example, the user 102. Moreover, when both the pre-change 1103 and the post-change 1104 have values, it indicates that the relevant value was changed.

Specific methods for generating and using the change difference information 543 will be described later with reference to a flowchart.

Figure 12:
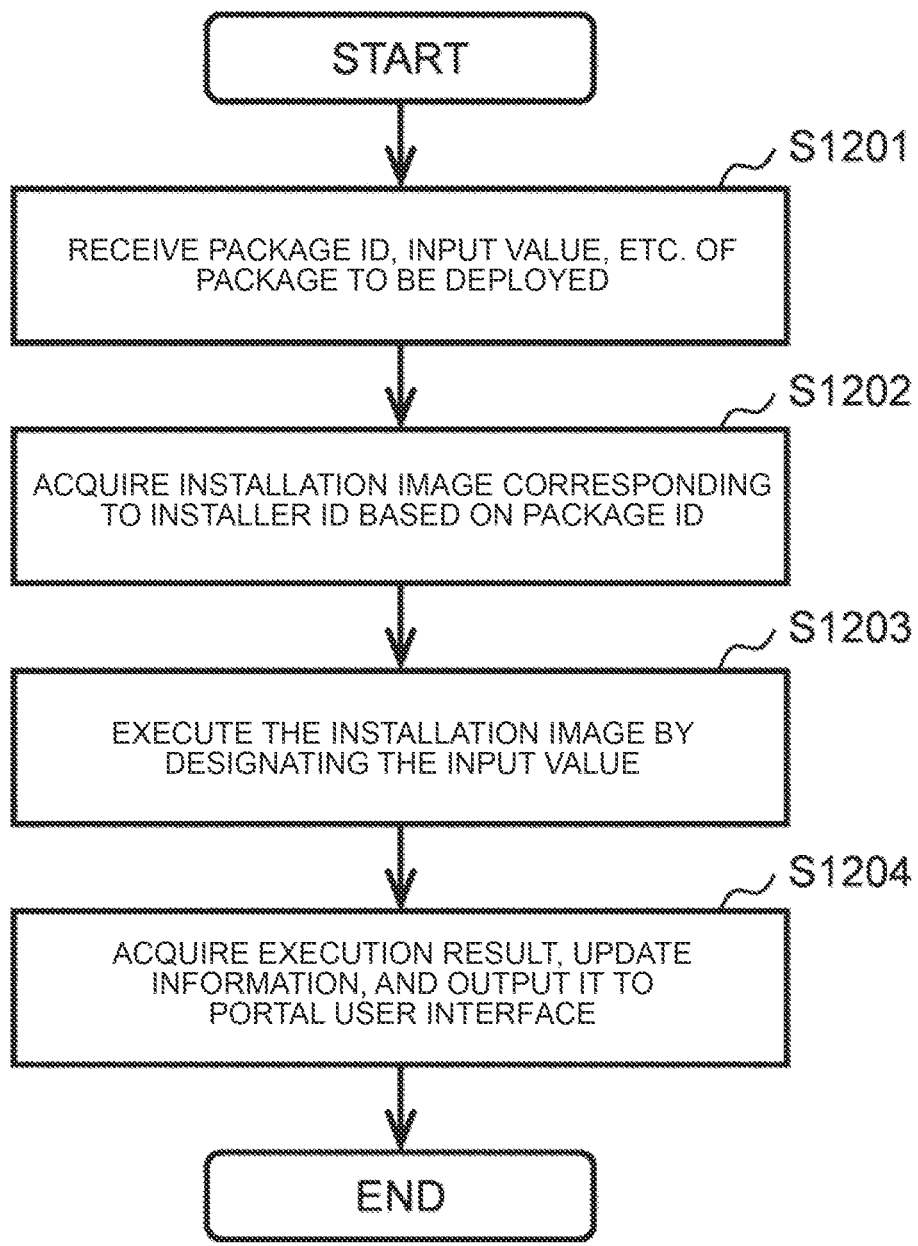
FIG. 12 is a diagram illustrating an example of a flowchart of deployment processing according to the first embodiment.

FIG. 12 is a diagram illustrating an example of a flowchart of the deployment processing. The deployment processing is processing which is basically executed by the deployment unit 533.

The deployment unit 533 waits in an instruction waiting state and receives the package ID and the input values (the values changed from the default values) selected by the user 102 on the portal user interface 135, and other information necessary for the deployment processing (the deployment destination, that is, the platform 805, and the credential 806), and so on from the portal information output unit 532 (step S1201). Incidentally, it may be designed in such a manner that the portal information output unit 532 updates (adds), for example, the input values to the instance management information 531 and the deployment unit 533 receives the instance ID of the current target and then refers to information necessary information for the deployment processing from the instance management information 531.

Subsequently, the deployment unit 533 refers to the package management information 133, identifies the installer ID 702 corresponding to the selected package, and acquires the corresponding installation image 131 from the registry 134 by using the identified installer ID 702 (step S1202). For example, in a case of a container type, this processing corresponds to pull processing of the container image as an example of the acquisition of the installation image 131.

Subsequently, the deployment unit 533 executes the deployment processing on the installation image 131 acquired in step S1202 with the input values acquired in step S1201 (step S1203). For example, in the case of the installation image 131 of the container type, the deployment unit 533 sets the input values as environmental variables and then executes run processing. Moreover, if the processing varies depending on the execution environment 140 which is the deployment destination, branching processing associated with the deployment destination may be a method of selecting it within the installation image 131 or a method of selecting the installation image 131 according to the deployment destination when each of the installation images 131 is divided for each deployment destination.

Incidentally, when the application image 132 corresponding to the application instance 141 described in the Config 142 is not automatically acquired based on the Config 142 on which the deployment processing has been executed in the execution environment 140 which is the deployment destination as in a case of, for example, kubernetes, the deployment unit 533 may also execute processing for acquiring the application image 132 for the application instance 141 included in the Config 142 from the registry 134 and registering (distributing) it in the execution environment 140 which is the deployment destination. This is often seen in a case of the IaaS which is a service for providing a virtual server as an IT resource.

Subsequently, after the completion of the deployment processing, the deployment unit 533 acquires the execution result from the execution environment 140 which is the deployment destination, updates the instance management information 531, and informs the portal information output unit 532 of it (step S1204). If the deployment processing is synchronous processing, the deployment unit 533 can execute step S1203 and step S1204 consecutively; however, if the deployment processing is asynchronous processing, the status may be acquired (polled) at certain intervals from the execution environment 140 which is the deployment destination.

Moreover, the deployment unit 533 may update the status 803 the instance management information 531 as, for example, Waiting→Deploying→Success (or Failed) in accordance with the status of the deployment processing.

Incidentally, the reason why the deployment unit 533 acquires the execution result from the execution environment 140 which is the deployment destination is because the execution environment 140 which is the deployment destination is a parameter which is automatically determined based on the information of the Config 142, but there is also information which is desired to be displayed as the result on the portal user interface 135. For example, an internal management ID, an IP address of a private network, a URL of an access destination, and so on are elements which are often seen.

After executing the above-described processing, the deployment unit 533 returns the processing to step S1201 (the instruction waiting state).

Figure 13:
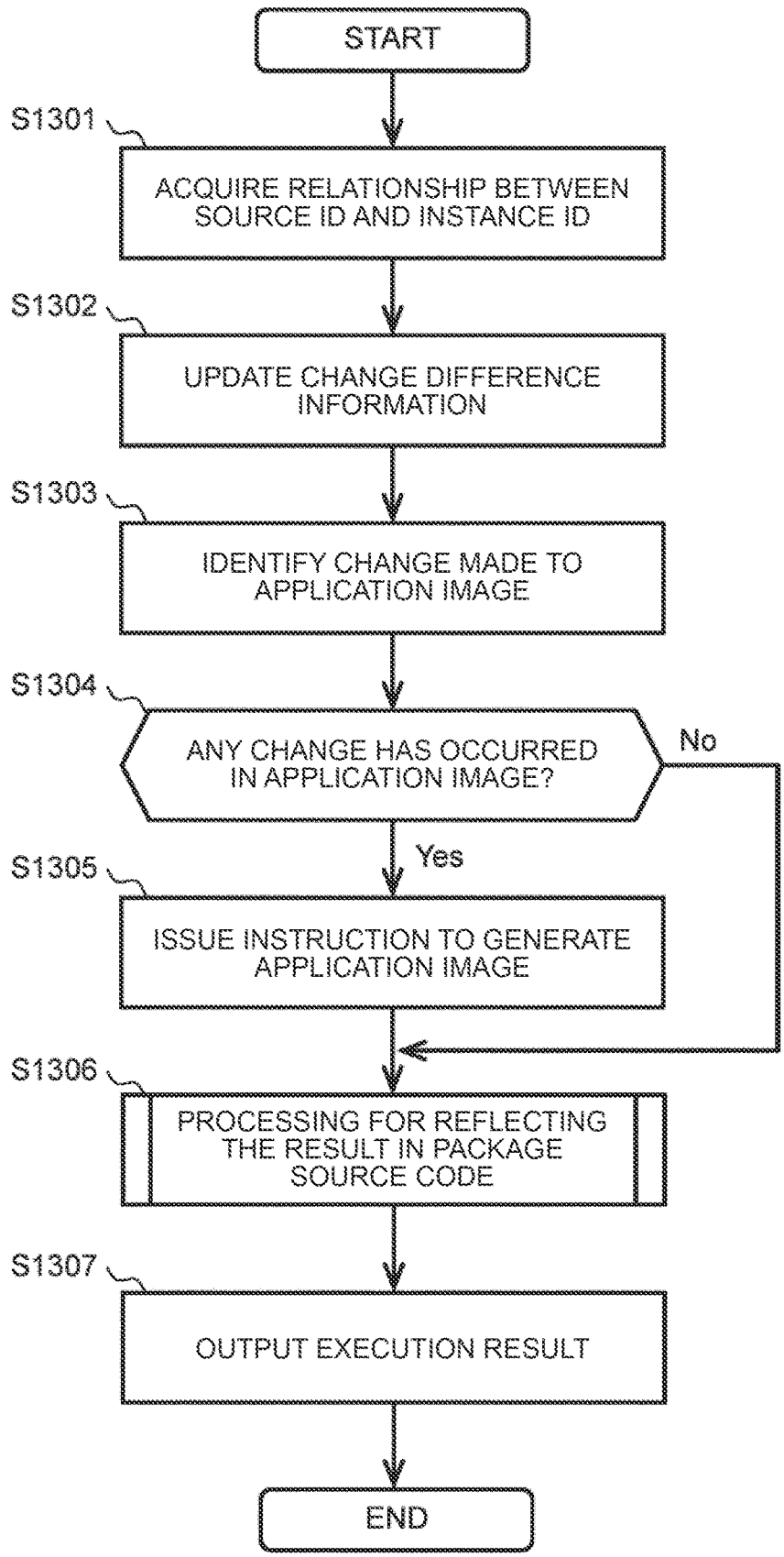
FIG. 13 is a diagram illustrating an example of a flowchart of packaging support processing according to the first embodiment.

FIG. 13 is a diagram illustrating an example of a flowchart of packaging support processing for registering a new instance 143 (which is also called an application or a solution) that was developed by the user 102 by using the instance 143 on which the deployment processing was executed, as a package in the marketplace system 130. The packaging support processing is processing which is basically executed by the packaging unit 151.

The packaging unit 151 starts the processing based on an instruction by the user 102 from the packaging support user interface 152 displayed by the support information output unit 545. The packaging unit 151 accepts the instance ID of the instance 143, which is the target of packaging, as an input to the packaging support user interface 152. Furthermore, the packaging unit 151 may accept the credential for accessing the execution environment 140 as an input in order to acquire necessary information from the execution environment 140 where the relevant instance 143 operates. Incidentally, regarding the credential, the packaging unit 151 may acquire the instance ID, which has been input, as the key from the instance management information 531 in the process of the processing of step S1301 described later.

In subsequent step S1301 to step S1303, a record (one row) of the correspondence relationship information 541 is created.

Firstly, the packaging unit 151 acquires the relationship between the instance ID of the instance 143, which has been input, and the source ID of the package which served as the base of the relevant instance 143 (step S1301). More specifically, the packaging unit 151 acquires the instance management information 531 from the marketplace system 130, refers to the instance ID 801, and identifies the package ID 802 corresponding to the input instance ID. Furthermore, the packaging unit 151 acquires the CI management information 521 from the CI system 120, refers to the package ID 602, and identifies the source ID 601 which matches the identified package ID 802. As a result of the above-described processing, the packaging unit 151 sets the input instance ID, the identified package ID 802, and the source ID 601 as the instance ID 901, the package ID 902, and the source ID 903 of the correspondence relationship information 541.

Subsequently, the packaging unit 151 creates the difference of the change regarding the Config 142 by the user 102 (or updates the change difference information 543) (step S1302). An example of what is created by the packaging unit 151 is a set of information as indicated in one difference ID 1101 of the change difference information 543.

An example of a method for creating the difference of the change is as follows. Firstly, the packaging unit 151 acquires the template information from the source ID 903 associated with the instance ID 901 of the instance 141, which is the target this time, and creates a Config 142 which is generated with the default value (that is, the value of the variable which is described in the variable file and which has not been changed) (hereinafter referred to as the default Config). This processing may be executed, for example, in a manner like a dry run function by using the installation image 131 and a tool for executing the deployment processing included in the installation image 131.

Then, the packaging unit 151 acquires the Config 142 changed by the user 102 from the execution environment 140 and finds the difference from the default Config (for example, by issuing a diff command), thereby identifying a row of the changed part. The packaging unit 151 identifies a path (for example, "spec.resource.request.cpu" of the target key path 1102) from a root by tracking a parent with regard to the key of each row of the identified changed part.

Then, if the type of the change is an update of the value (that is, when the key itself exists both in the default Config and in the Config 142 after the change and only the value is changed), the packaging unit 151 sets the value of the relevant row (value) of the default Config to the pre-change 1103 and sets the value of the relevant row (value) of the Config 142 to the post-change 1104. If the type of the change is an addition (that is, when the key does not exist in the default Config), the packaging unit 151 sets "–" meaning no existence to the pre-change 1103 and sets the value of the relevant row (value) of the Config 142 to the post-change 1104. If the type of the change is a deletion (that is, the key exists only in the default Config), the packaging unit 151 sets the value of the relevant row of the default Config to the pre-change 1103 and sets "–" meaning no existence to the post-change 1104.

Accordingly, as described above, the packaging unit 151 creates the values before and after the change (the pre-change 1103 and the post-change 1104) regarding the changed key (the target key path 1102) and updates the change difference information 543.

Furthermore, the packaging unit 151 identifies whether or not any change regarding the application image 132 has been made by the user 102 (step S1303). As an example, the user 102 themselves inputs the application instance 141 which has been changed (or which is desired by the user 102 to be changed to another application image 132) (or the application image 132 which served as the base may be used on the display) as the input to the packaging support user interface 152 and uses the input information.

Moreover, the packaging unit 151 may identify the application instance 141, which operates in the execution environment 140, from the Config 142 and find the difference between the application image 132 of the application instance 141 and the application image 132 which served as the base and is stored in the registry 134, thereby identifying the changed application image 132. Regarding the method of finding the difference besides total comparison, it is possible to perform the comparison for the container type by using a hash value. Moreover, the packaging unit 151 may treat the application image 132 of the application instance 141, which is moving in the uniform (that is, the entire) execution environment 140, as being changed. Whether or not any change has been made to the thus-identified application image 132 is set to the value of the image change flag 905 ("true" if the change has been made; and "false" if no change has been made) of the correspondence relationship information 541.

Imaging processing associated with packaging (step S1304 and step S1305) and reflection processing on the package source code 111 (the template information which serves as the base for the Config 142) (step S1306) will be explained below. Incidentally, these two processing sequences will be described and explained in this order because a new application image ID generated by the imaging processing is also used for the reflecting processing.

Firstly, the imaging processing will be explained. The packaging unit 151 refers to the image change flag 905 with respect to the instance 143 which is the packaging target, and judges whether any change has occurred in the application image 132 or not (step S1304). If the packaging unit 151 determines that the change has occurred (when the image change flag 905 is "true"), the processing proceeds to step S1305; and if the packaging unit 151 determines that no change has occurred (when the image change flag 905 is "false"), the processing proceeds to step S1306. Incidentally, if the instance 143 includes a plurality of application instances 141, the packaging unit 151 executes this processing for each application image 132.

Then, if the packaging unit 151 determines that the change has occurred, it issues an instruction to the imaging unit 544 to generate the application image 132 of the relevant application instance 141 (imaging) (step S1305). The imaging processing by the imaging unit 544 will be described later with reference to a flowchart illustrated in FIG. 14.

Subsequently, the packaging unit 151 executes the reflection processing on the package source code 111 (the template information) (step S1306). The reflection processing (template information generation processing) will be described later with reference to flowcharts illustrated in FIG. 15 and FIG. 16.

The packaging unit 151 delivers the result of the above-described processing to the support information output unit 545 and the support information output unit 545 displays the result on the packaging support user interface 152 (step S1307). Incidentally, a display example of the packaging support user interface 152 will be described later with reference to FIG. 17.

Then, the packaging unit 151 terminates the packaging support processing. Incidentally, the packaging unit 151 may display a dialogue for judging whether or not to register the package according to the result presented to the user 102 on the packaging support user interface 152 before the termination of the packaging support processing; and if the user 102 selects to register the package, processing for storing the set of results generated this time (the template information, the package source code 111, and the application image 132) as a new package to the repository 110, the registry 134, and so on may be executed.

Incidentally, although it has been explained that in step S1302, the packaging unit 151 acquires the template information from the source ID 903, other information and binary data (for example, the binary data included in the bin directory 201, information included in the apps directory 205, and other data such as a test code), that is, a set of the package source codes 111, and a set of information associated with the target package ID may be collectively acquired (these pieces of information will be hereinafter referred to as package-related information).

Then, the packaging unit 151 may execute processing for displaying the package-related information together with the display of the result to the user 102 in step S1307 and further registering the acquired package-related information together with the template information created by the packaging support processing when registering the new package.

Figure 14:
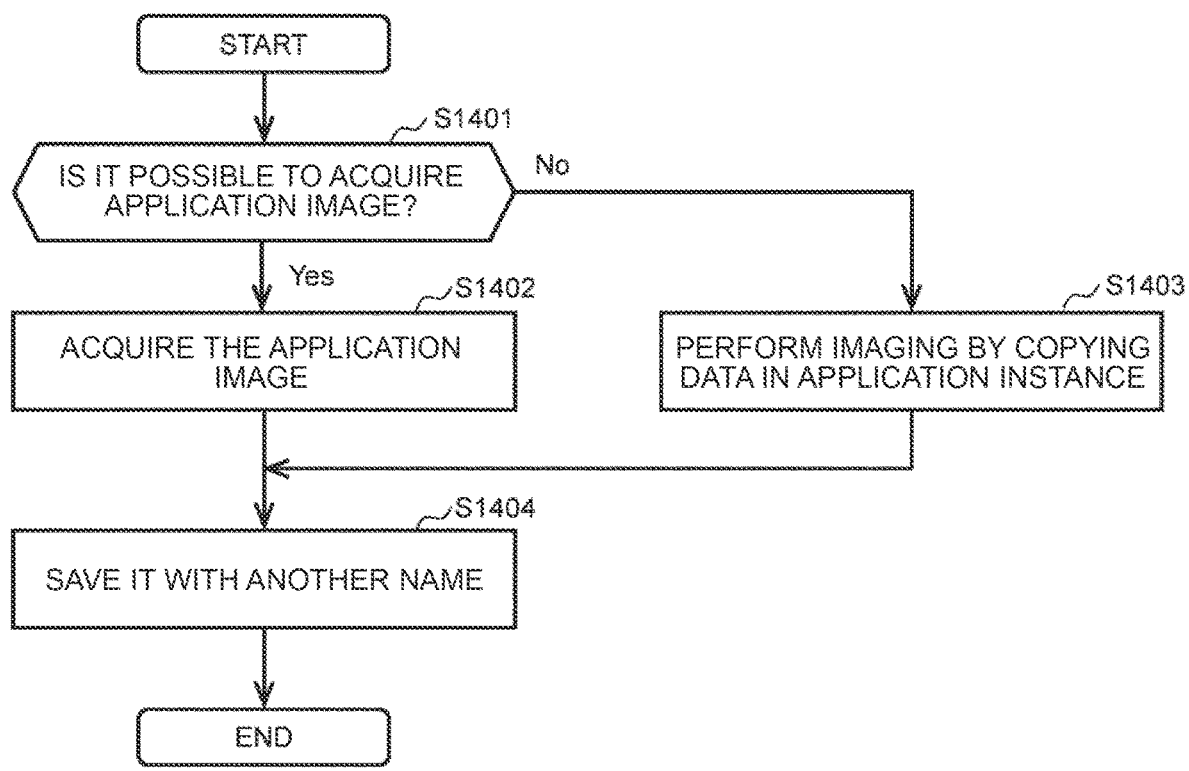
FIG. 14 is a diagram illustrating an example of a flowchart of imaging processing according to the first embodiment.

FIG. 14 is a diagram illustrating an example of a flowchart of the imaging processing. The imaging processing is processing which is basically executed by the imaging unit 544.

The imaging unit 544 starts the processing with respect to the application stance 141 regarding which imaging is to be performed (the application image 132 regarding which the packaging unit 151 issued the instruction to perform imaging in step S1305) from among the application stances 141 which operate in the execution environment 140.

Firstly, the imaging unit 544 judges whether or not the application instance 141 which is desired to be acquired from the execution environment 140 can be acquired as the application image 132, by checking, for example, if the execution environment 140 includes an interface (I/F) for acquiring the application image 132 (step S1401). If the imaging unit 544 determines that the application image 132 can be acquired, the processing proceeds to step S1402; and the imaging unit 544 determines that the application image 132 cannot be acquired, the processing proceeds to step S1403.

Under this circumstance, the case where the application image 132 "can be acquired as the application image 132" means, for example, the following.

(Example 1) A case where a function that acquires an entity of the application image 132 is provided as an API included in the execution environment 140 by setting, for example, the ID of the application instance 141, which is desired to be acquired, as the key.

(Example 2) A case where the application image 132 can be acquired by combining the method indicated in (Example 1) and the related tools.

When kubernetes whose container engine is docker is used and they can be managed with management authority, a specific example is a method for identifying a Node (a virtual server which constitutes a kubernetes cluster) where the application instance 141 which is desired to be acquired operates, by using a kubectl command (kubernetes management CLI (Command Line Interface)), and logging into the identified Node by means of, for example, ssh (Secure Shell) and executing imaging (docker commit) by a docker command (docker management CLI).

(Example 3) A case where an Agent for imaging processing is made to operate in the execution environment 140 and the application image 132 corresponding to the application instance 141 can be acquired via the Agent as a method similar to (Example 2).

For example, it is a method of causing a dind (docker in docker) container to operate as the Agent for kubernetes and perform imaging by a docker command within the dind container.

Incidentally, regarding the above-described means, the imaging unit 544 may be designed in such a manner that it retains different methods for each type of the execution environment 140 (that is, each type of the platform 805) and use them differently.

When there is any means of acquiring the application image 132, the imaging unit 544 uses the aforementioned means and acquires the application image 132 (step S1402).

On the other hand, when the application image 132 cannot be acquired directly, the imaging unit 544 copies data in the application instance 141 (full backup) as alternative processing (step S1403). For example, in a case of kubernetes, the imaging unit 544 can draw out all the data in the application instance 141, on which the processing is being executed, by using a "kubectl cp {source_path}{target_path}" (elements inside { } are variables) command on the target application instance 141. Moreover, a tool or the like for performing such a backup may be made to operate in the application instance 141 in the execution environment 140 and be used.

Incidentally, the above explanation has been provided on the premise that all the data in the application instance 141 are to be copied; however, if the location which can be changed freely by the user 102 can be identified by, for example, the Config 142, the imaging unit 544 may copy the data by narrowing down the relevant range. In a case of the Config 142 which is kubernetes as an example, it would be basically enough to copy only a storage area which is mounted in the relevant application image 132 as a PV (Persistent Volume).

The imaging unit 544 can reproduce the application image 132, which is changed by the user 102, by copying the data, then executing the application image 132 which served as the base (that is, the original) as the application instance 141 (at the location where the imaging unit 544 operates), overwriting the application instance 141 with the copied data, and performing imaging of that application instance 141.

The imaging unit 544 assigns another ID, which is different from the application image ID 604 of the application image 132 which served as the base, to the entity of the thus-acquired application image 132 and saves it with the other newly-assigned ID in the registry 134 (step S1404). Under this circumstance, another ID is a unique ID in the whole, for example, an identifier based on the information such as the application image ID 604 of the application image 132 which served as the base, the identifier of the user 102, and the instance ID, a UUID, and so on.

Incidentally, it may be designed in such a manner that saving in the registry 134 may be performed not at this timing, but after the termination of step S1307 of the packaging unit 151 and with the presentation of the result to the user 102 and the approval of the registration by the user 102. If step S1404 is executed after step S1307, there is an advantage of being capable of also reflecting the result of the change by the user 102.

Then, the imaging unit 544 adds the change to the change difference information 543 corresponding to the instance 143 which is the target this time. Specifically speaking, the imaging unit 544 sets the location indicating the acquired or generated application image 132 (for example, "spec.image"), as the target key path 1102, to the difference ID 1101 which matches the target instance 143, sets the application image ID 604 which served as the base to the pre-change 1103, and sets the newly-assigned application image ID to the post-change 1104.

The imaging unit 544 executes the above-described processing, informs the packaging unit 151 of, for example, whether the result was successful or not and the execution result, and terminates the imaging processing.

Figure 15:
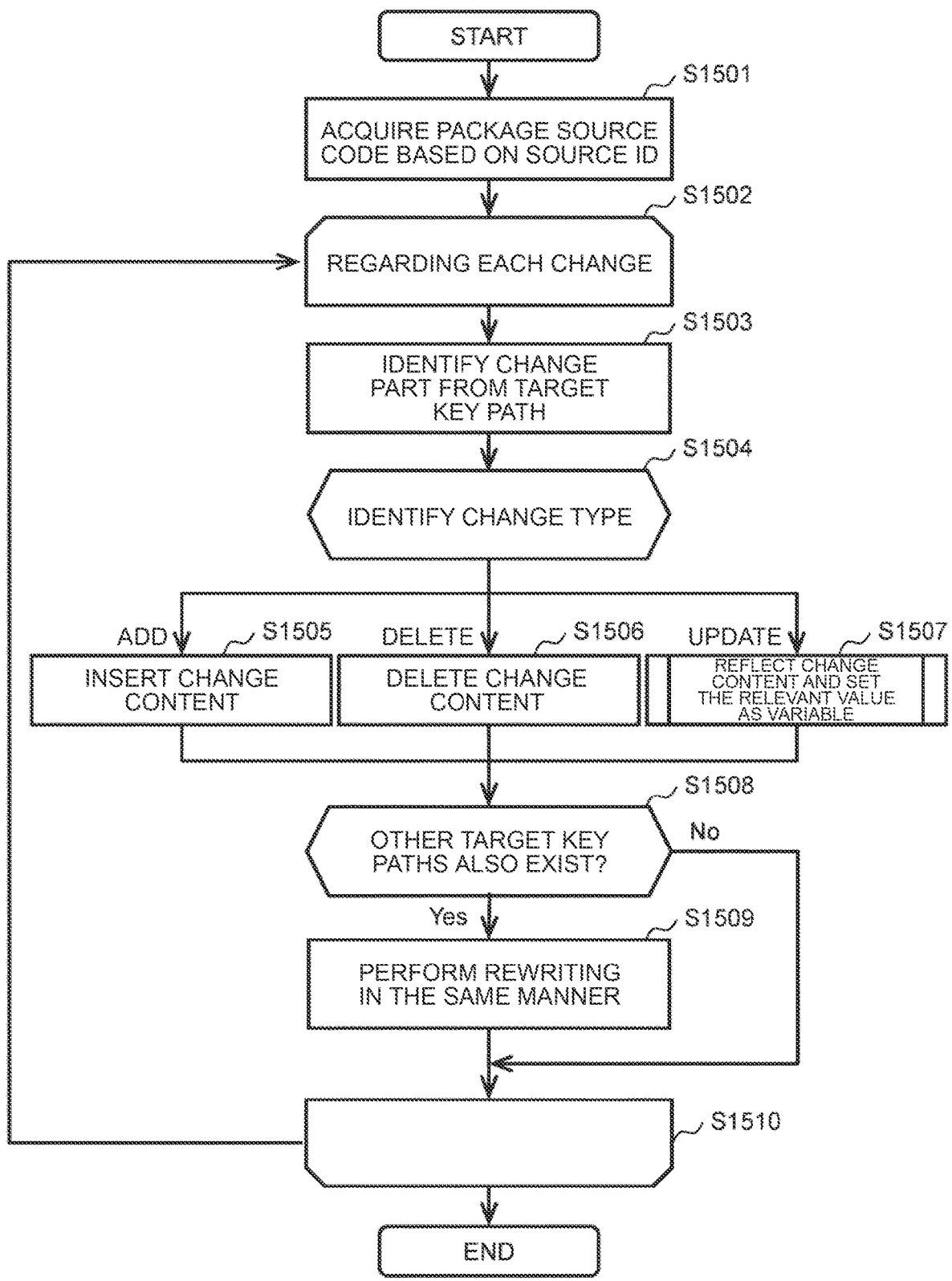
FIG. 15 is a diagram illustrating an example of a flowchart of template information generation processing according to the first embodiment.
Figure 16:
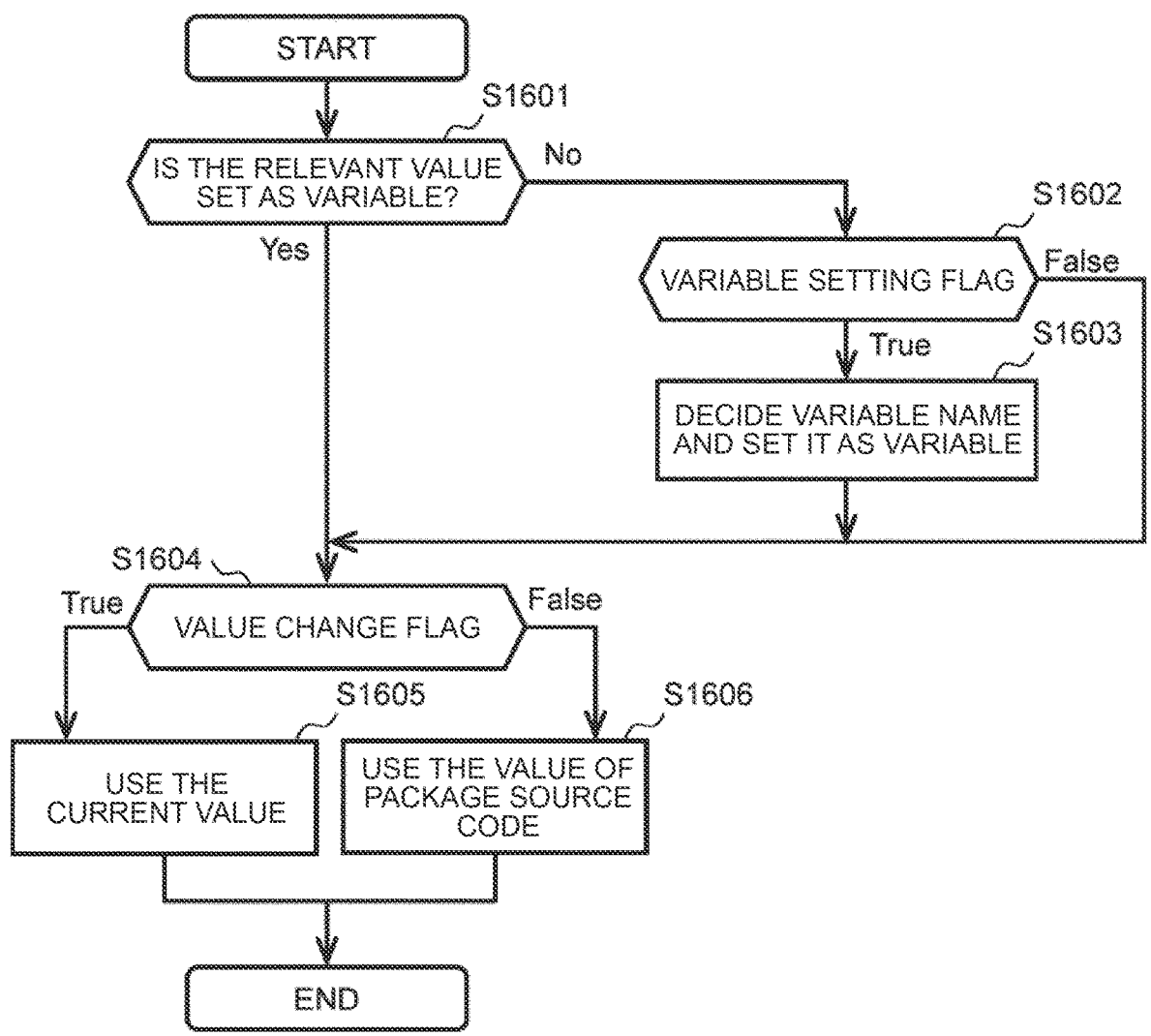
FIG. 16 is a diagram illustrating an example of a flowchart of template information generation processing according to the first embodiment.

FIG. 15 and FIG. 16 are diagrams illustrating an example of flowcharts of the template information generation processing. The template information generation processing is processing which is basically executed by the packaging unit 151.

Firstly, the packaging unit 151 refers to the correspondence relationship information 541 and acquires the entity of the package source code 111 (hereinafter referred to as the original source code) from the repository 110 by using the source ID 903 of the instance 143 which is the target of packaging (step S1501).

Incidentally, the packaging unit 151 may acquire the input values 807 of the target instance 143 from the instance management information 531 together with step S1501 and overwrite the value of the variable file (for example, the values.yaml 208) of the package source code 111 acquired in step S1501. However, as it was stated in step S1302, the change of the input values 807 should be included in the change difference information 543, so that normally it is unnecessary to reflect the input values 807 in the variable file.

Next, the packaging unit 151 executes the following rewrite processing (step S1502 to step S1510) on the original source code by using a set of changes indicated by the difference ID 1101 corresponding to the instance 143 of the change difference information 543, which is the change of the target instance 143 (for example, the set of {the target key path 1102, the pre-change 1103, the post-change 1104} included in "diff1").

Firstly, the packaging unit 151 identifies the location (row, that is, the changed part) in the original source code by using the hierarchical structure with respect to the target key path 1102 which is the processing target for the set of changes (step S1503).

Next, the packaging unit 151 judges the type of the change from the values of the pre-change 1103 and the post-change 1104 corresponding to the relevant target key path 1102 (step S1504). More specifically, when the pre-change 1103 is "–", the packaging unit 151 determines that the type of the change is an "addition" and the processing proceeds to step S1505, when the post-change 1104 is "–", the packaging unit 151 determines that the type of the change is a "deletion" and the processing proceeds to step S1506; and in a case other than the above cases (when both the pre-change 1103 and the post-change 1104 have values), the packaging unit 151 determines that the type of the change is an "update" and the processing proceeds to step S1507.

When the type of the change is the addition and the target key path 1102 is the addition (that is, when the change does not exist in the template file of the original source code), the packaging unit 151 inserts the values of the target key path 1102 and the post-change 1104 to immediately after a parent key (step S1505). For example, when the value of the target key path 1102 is "spec.name" and the value of the post-change 1104 is "4" and they are to be inserted into the deploy.yaml 207, the packaging unit 151 inserts "spec.name: 4" to a row next to "spec:". The reason why these values are inserted immediately after the parent key is because otherwise (for example, if the values are inserted into "resource:" in the deploy.yaml 207) the parent-child relationship in the subsequent rows would change and their original meaning would be lost.

Regarding this insertion processing, the packaging unit 151 may execute processing for changing the value in consideration of the value change flag 1003. The details will be explained in step S1507; however, the value change flag 1003 is a flag for judging whether the value used this time (the value when recognizing the target key path 1102 as the key) should be reflected in the package or not. This meaning is also adopted for the insertion processing. When the value change flag 1003 of the target key 1002 corresponding to the target key path 1102 is "true," the packaging unit 151 may use the value of the post-change 1104 as it is; and when the value change flag 1003 of the target key 1002 corresponding to the target key path 1102 is "false," the packaging unit 151 may execute processing for rewriting the value with a null, the value of the pre-change 1103 ("–" in this example), a dummy value which is not the post-change 1104, and so on.

Moreover, regarding a modification of the Config 142 by the user 102, the packaging unit 151 sometimes adds settings regarding the application image 132 which is newly created by the user 102 themselves or the existing application image 132 to the Config 142 and causes it operate as the application instance 141. For example, when the execution environment 140 is kubernetes, the operation which is generally performed is to add the application instance 141 by adding the application image 132 to the Config 142 in order to realize, for example, a design pattern called sidecar. Therefore, when the target key path 1102 is the addition of the application image 132 by the addition of the application instance 141 (for example, when the key includes "image"), the sequence of the processing of the imaging unit 544 may be executed as the imaging of the application instance 141 added by the user 102.

Moreover, when the type of the change is the deletion, the packaging unit 151 deletes the relevant row (the change content) of the target key path 1102 of the original source code (step S1506).

Moreover, when the type of the change is the update, the packaging unit 151 executes processing for changing the value part corresponding to the target key path 1102 from the pre-change 1103 to the post-change 1104 or setting the variable setting, and then adding it to the variable file (step S1507). The details will be described later with reference to FIG. 16.

Basically, there is one location of the target key path 1102 in the template file; however, a plurality of locations may sometimes match under a certain condition (for example, in cases described below). The packaging unit 151 judges whether or not there is any description that matches the specified condition (whether another target key path 1102 exists or not) (step S1508). When the packaging unit 151 determines that another target key path 1102 exists, the processing proceeds to step S1509; when the packaging unit 151 determines that no other target key path 1102 exists, the processing proceeds to step S1503; and when there is no unprocessed change, the packaging unit 151 terminates the template information generation processing.

(Example 1) A case where the target key path 1102 is described with a regular expression, array, or the like (Example 2) A case where the template file includes a programmatic conditional branch (such as if/else, while, or swich/case) and the processing branches (For example, "spec.image" appears twice with the same meaning in {{if.Values.flag}}spec.image:A{{else}}spec.image:B{{end}}.)

Then, when there are a plurality of matching descriptions as described above, the packaging unit 151 executes the same type of rewrite processing, that is, the processing in step S1504 and subsequent steps with respect to each part which has not been rewritten by the above-described processing (each row which has not been rewritten in the template file) (step S1509).

The packaging unit 151 executes the above-described processing with respect to all target key paths 1102 included in the difference ID 1101 and terminates the template information generation processing.

The details of step S1507 will be explained with reference to FIG. 16.

Firstly, the packaging unit 151 judges whether or not the variable setting is set for the value for the key matching the target key path 1102 which is the update target (that is, the value part of "key:value") (step S1601). When the packaging unit 151 determines that the variable setting is set for the current target, the processing proceeds to step S1604; and when the packaging unit 151 determines that the variable setting is not performed for the current target, the processing proceeds to step S1602.

Under this circumstance, the variable setting means that the value is set in a form designated in the variable file. For example, "{{.Values.name}}" of the deploy.yaml 207 is set as the variable.

When the variable setting is not set, the packaging unit 151 refers to the transformation rule information 542 and acquires the variable setting flag 1004 which matches the target key 1002 of the target key path 1102 which is the target. Under this circumstance, to match the target key 1002 means that, for example, when the target key path 1102 is "spec.image", target keys 1002 that match "image" which is the key at the end are examined in descending order of the priority 1001. Incidentally, when the target key 1002 is described with the regular expression, values including the parent key may be recognized as matched.

Then, the packaging unit 151 judges whether the variable setting flag 1004 which has matched the condition for the first time (that is, which has matched the target key 1002 with the highest priority) is "true" or not (step S1602). If the packaging unit 151 determines that the variable setting flag 1004 is "true," the processing proceeds to step S1603; and if the packaging unit 151 determines that the variable setting flag 1004 is "false," the processing proceeds to step S1604.

When the variable setting flag 1004 is "true," it means that the variable setting may be set; and the packaging unit 151 sets the variable setting of the target key path 1102 which is the target to be updated. More specifically, the packaging unit 151 executes processing for deciding one new variable key which does not exist in the variable key included in the variable file and replacing the value part of the target key path 1102, which is the target, with a variable which is meant by the decided variable key.

For example, when the target key path 1102 is "spec.resource.request.cpu" of the deploy.yaml 207 and "req-cpu" can be used as the key which is not included in the values.yaml 208, the packaging unit 151 sets "{{.Values..req-cpu}}" to where the value of that deploy.yaml is "2", and inserts "req-cpu:" to the values.yaml 208. Under this circumstance, the packaging unit 151 decides the default value to be described in the values.yaml 208 on the basis of the results of step S1604 to step S1606.

The variable key may be anything as long as it is not included in the values.yaml 208 (and it is not against the rules of the variables as determined by the tool used for the deployment processing). However, the more appropriate way to decide the variable key is to use a character string which is often used as the corresponding variable key for each target key 1002 or target key path 1102. In order to implement this, all the template files for all the package source codes 111 which currently exist in the repository 110 are searched, frequency of the variable key used for each target key path 1102 is calculated, and the variable key with the highest frequency should be used preferentially. For example, if it is found as a result of the search of all the package source codes 111 and the template files which are included in the repository 110 that "spec.resource.request..cpu:{{.Values.req-cpu}}" appears five times and "spec.resource.request.cpu:{{.Values.req.cpu}}" appears twice, it means that "req-cpu" should be used preferentially as the variable key.

Incidentally, regarding the judgment to decide whether to set the variable setting, the packaging unit 151 may execute the processing for setting the variable setting when the variable setting is often performed for the template files of the package source codes 111 of other packages. More specifically, if the variable setting is set when the number of parts identified in the relevant target key path 1102 is equal to or more than a certain value (threshold value) in the template files of the package source codes 111 of the packages other than the current target package, the processing for setting the variable setting may be performed also for the current processing. For example, whether the value corresponding to the target key path 1102 "spec.resource.request.cpu" of the template files included in the package source codes 111 of all the packages is set as a variable or not (whether it is, for example, "{{.Values.req-cpu}}" in the example of FIG. 3) (that is, whether it is a fixed value such as "2" in the example of FIG. 3) is counted. Then, if the number of times when the variable setting is set for the value which matches the target key path 1102 is equal to or more than a certain number of times (for example, twice or more) or is equal to or more than a certain rate (for example, 50% or more), the processing for also setting the variable setting this time is executed.

Similarly to the processing executed in step S1602, the packaging unit 151 acquires the value change flag 1003 that matches the target key path 1102 which is the target to be updated, and then judges whether the value of the acquired value change flag 1003 is "true" or not (step S1604). If the packaging unit 151 determines that the value of the value change flag 1003 is "true," the processing proceeds to step S1605; and if the packaging unit 151 determines that the value of the value change flag 1003 is "false," the processing proceeds to step S1606.

If the value of the value change flag 1003 is "true," it means to adopt the current value (to change the default value); and the packaging unit 151 rewrites the relevant value with the value of the post-change 1104 as the value corresponding to the target key path 1102 (step S1605). When the variable setting is set, the packaging unit 151 uses the value of the post-change 1104 as the default value of the variable which is added to the variable file this time.

If the value of the value change flag 1003 is "false," it means to use the original value of the package source code 111 (the value of the pre-change 1103) as it is; and the packaging unit 151 uses the pre-change 1103, without any change, as the value corresponding to the target key path 1102 (step S1606). When the variable setting is set, the packaging unit 151 uses the value of the pre-change 1103 as the default value in the same manner.

The packaging unit 151 executes the above-described processing and then executes processing in step S1508 and subsequent steps.

This embodiment has been described so that the Config 142 which is the target of packaging is generated via deployment on the basis of the template information and the input by the user 102 and is then changed by the user 102. However, a change which is not intended by the user 102 may sometimes occur due to the orchestration tools, the execution environment 140, and so on. For example, in a case of Kubernetes, for example, deployment time of day (an example of the key: Time Stamp) and a unique identifier in Kubernetes (an example of the key: UUID) may sometimes be automatically inserted (or added) to the deployed Config 142 for the purpose of internal management. Such automatic insertion of the key(s) is specific to the instance 143 and the inserted key(s) should be excluded from the target of packaging. Therefore, processing for excluding the key(s) which was thus automatically inserted into the Config 142 by a method described below may be executed.

Since generally the automatically inserted part(s) (key(s)) are decided, one example is a method of defining, in advance, a part(s) which will not be judged as a change(s) due to the automatic insertion and then not judging the automatically inserted part(s) as the change(s) upon the update of the change difference information (step S1302), that is, excluding the automatically inserted part(s) from the change difference information 543. Moreover, another example is a method of considering the automatically inserted part(s) as the change(s) with regard to the change difference information 543 and excluding the change(s) based on the information of the automatically inserted part(s), which was defined in advance, upon the change content reflection and insertion processing (step S1505) if the change(s) was automatically inserted, that is, not inserting the automatically inserted part(s).

Figure 17:
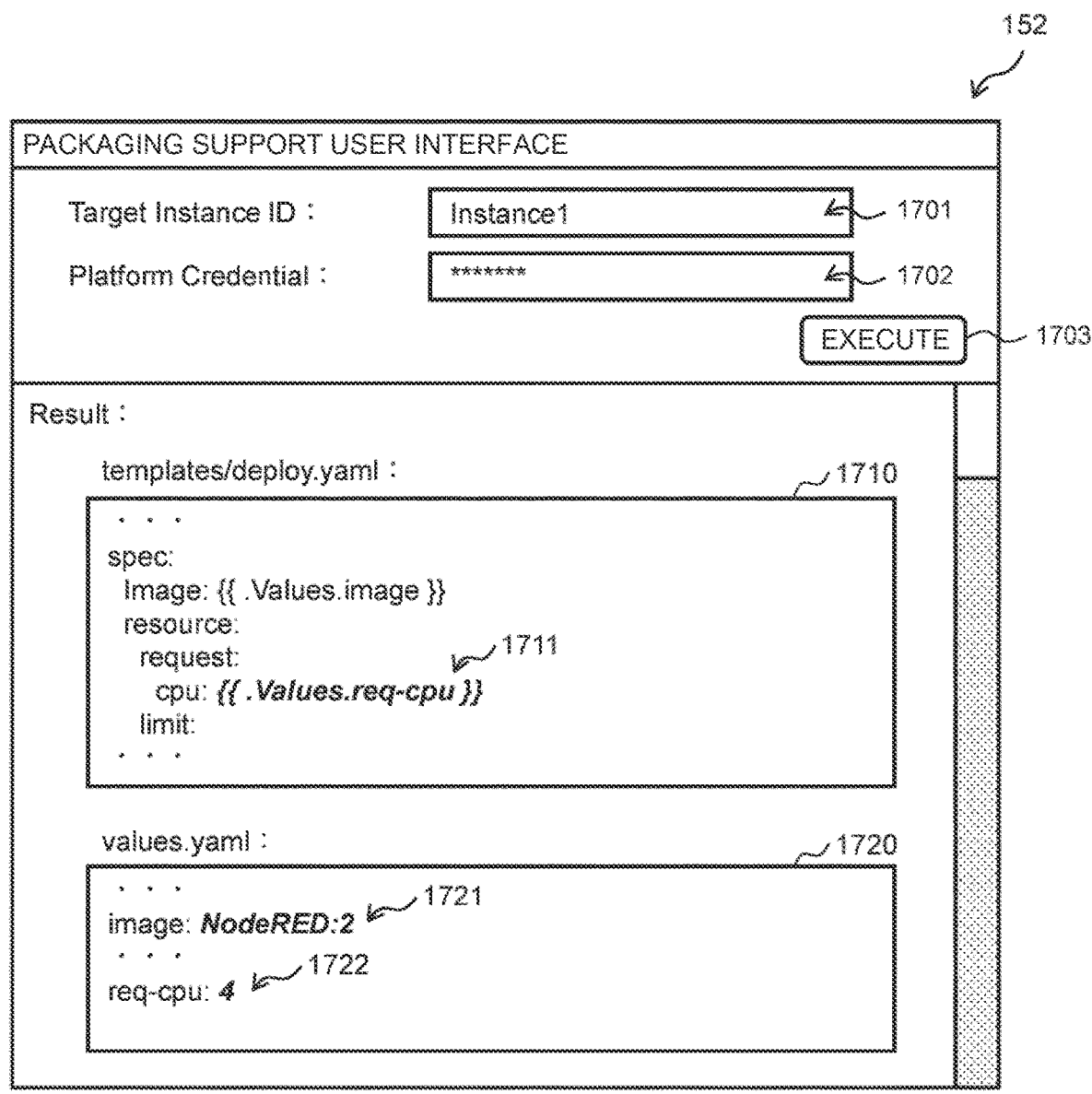
FIG. 17 is a diagram illustrating an example of a packaging support user interface according to the first embodiment.

FIG. 17 is a diagram illustrating an example of the packaging support user interface 152.

The packaging support user interface 152 receives an identifier 1701 of the current target instance 143, information 1702 for accessing the execution environment 140, and so on from the user 102 and displays the result of packaging to the user 102.

Information displayed as the result, among the above-described information, is the result of the processing executed by the packaging unit 151 (a new template file is a template file 1710 and a new variable file is a variable file 1720). Furthermore, parts which have been changed by the packaging unit 151 such as a part where the variable setting was set 1711, a new image ID 1721 obtained by newly performing imaging, and a part whose value has been changed 1722 may be displayed by highlighting the changes.

Furthermore, when the imaging unit 544 performed imaging, an interface for also displaying the newly imaged application image ID and the outline of that processing and having the user 102, for example, confirm and modify them may be provided. Moreover, metadata 703, additional information, and so on of the original package may be also displayed on the packaging support user interface 152 in order to create the metadata of the new package and edit the additional information (such as test cases and management information) included in the original package in a format editable by the user 102.

In this embodiment, for example, the user of the marketplace develops a new system by using a registered package; and in a use case where the new system is registered in the marketplace again, the content of the package of the system which is to be registered this time is proposed based on the information of the package, which served as the base, and information of the developed system. Accordingly, even the user who does not have enough knowledge of packaging can easily register the new package.

(2) Second Embodiment

In the first embodiment, the processing for copying data (step S1403) was illustrated by an example of the alternative processing when the execution environment 140 does not include the API for imaging. However, the copying method may not sometimes be sufficient from the standpoint of overhead of the processing and reproducibility of the application image 132. On the other hand, as one of methods for the user 102 to change the application instance 141, there is also a case where the user 102 prepares the CI system and the CI system is used to create a new application image 132 by using the original application image 132 and cause the newly created application image 132 to operate as the application instance 141. Under this circumstance, the problem of step S1403 can sometimes be solved by making use of the aforementioned characteristics. This embodiment will be explained mainly on this point.

FIG. 18 is a diagram illustrating an example of the configuration of the packaging support system 150 according to this embodiment.

Referring to FIG. 18, a package system 1800 is configured by including a user repository 1810 and a user CI system 1820 in addition to the configuration of the package system 100 illustrated in FIG. 5.

The user repository 1810 stores a source code 1811 for changing an application image 132. If the application image 132 is of a container type as an example, the source code 1811 includes a configuration file and script based on which the modification content is reflected in the application image 132, and a build file (for example, a Dockerfile) for building the application image 132. The application image ID 604 of the application image 132 included in the package serving as the base for the application instance 141 which is the current target is designated for designation of the image in the build file of the above-described information.

Then, the user CI system 1820 executes processing similar to that executed by the CI system 120 from the information of the source code 1811 and generates (builds) the application image 132 changed by the user 102. Incidentally, the user CI system 1820 may execute processing, in addition to building of the application image 132, for replacing the application instance 141 included in the instance 143 of the execution environment 140 with the application instance 141 which is the execution state of the currently newly built application image 132.

Moreover, the package system 1800 may include a user registry for registering and retaining the application image 132 created by the user 102, as an element for performing the above-described replacement. Furthermore, the package system 1800 may be configured so that the registry 134 may have a user area instead of the user registry and the application image 132 changed by the user 102 may be registered and retained here.

With the above-described package system 1800, the imaging unit 544 may perform a building method described below in addition to the two types of methods for creating the application image 132 (for example, the acquisition method illustrated in step S1402 and the copying method illustrated in step S1403). Incidentally, regarding the priority order, the acquisition method (step S1402), the building method (described below), and the copying method (step S1403) should preferably executed in the above-listed order from the standpoint of high reproducibility and low processing cost.

The building method will be explained below.

The imaging unit 544 executes processing by using, as input, the source ID for identifying the source code 1811 created by the user 102 for changing the application image 132. This source ID can be acquired by, for example, input by the user 102 on the packaging support user interface 152, descriptions (if there is information described in the Config 142) of meta-information in the Config 142 (for example, a comment in a metadata area where a free description can be made, an original extended label, and so on), and judgment from logs of the execution environment 140 and the user CI system 1820 (if the logs can be acquired in any of the above cases).

Then, the imaging unit 544 reproduces (builds) the application image 132 of the user 102 based on the build file included in the source code 1811 and sets this as a new application image 132. Besides this, if the CI system 120 and the user CI system 1820 are available, their processing may be used to acquire the application image 132 (or the application image ID 604 of the registry 134 where the application image 132 is stored) instead of the creation of the application image 132.

According to this embodiment, the application image can be created by using the user CI system even if the application image cannot be acquired from the execution environment.

(3) Third Embodiment

Regarding the package management information 133 indicated in the first embodiment, the linkage between the package ID 701 and the installer ID 702 and the relationship between the metadata 703 and the package ID 701 which are used, for example, to be displayed on the portal user interface 135 may be sometimes divided to separate pieces of information due to, for example, different update timings or for convenience of implementation (hereinafter referred to as deployment management information composed of the package ID 701 and the installer ID 702 and portal display information composed of the metadata 703 and the package ID 701).

Furthermore, the portal display information can be formed such that it is not generated from the source code 111, but is described by the provider 101 by using the portal user interface 135.

Accordingly, even if the package management information 133 is divided into two pieces of information such as the deployment management information and the portal management information, it is possible to support packaging (provision of this idea). The packaging unit 151 can essentially execute the processing if it has the deployment management information. So, the deployment management information may be acquired instead of the package management information 133. Furthermore, as far as the support of packaging is concerned, the packaging unit 151 may, for example, acquire the portal management information from the marketplace system 130 and display it as reference information on the packaging support user interface 152.

(4) Other Embodiments

Incidentally, the aforementioned embodiments have described the case where the present invention is applied to the packaging support system; however, the present invention is not limited to this example and can be applied to a wide variety of other systems, apparatus, methods, and programs.

Moreover, in the aforementioned embodiments, the structure of each table is one example and one table may be divided into two or more tables or all or some of two or more tables may be one table.

Moreover, in the aforementioned embodiments, various kinds of data have been explained by using XX tables and XX files for the purpose of illustration; however, the data structure is not limited to such examples and may be expressed as, for example, XX information.

Moreover, the information such as the programs, tables, and files for implementing each function in the above-descried explanation may be retained in storage apparatuses such as memories, hard disks, and SSDs (Solid State Drive) or storage media such as IC cards, SD cards, and DVDs.

The aforementioned embodiments have, for example, the following characteristic configurations.

A packaging support system (for example, the packaging support system 150) capable of communicating with a first management unit (for example, the repository 110) that manages one or more source codes (for example, the package source code 111), and a marketplace system (for example, the marketplace system 130) that manages one or more packages created based on one of the source codes and causes a package, regarding which an instruction is issued from a terminal operated by a user (for example, the user 102), to be available as an instance (for example, the instance 143) in a specified execution environment (for example, the execution environment 140), wherein the packaging support system includes: a storage apparatus that stores correspondence relationship information (for example, the correspondence relationship information 541) which is associated with identification information capable of identifying a package (for example, the package ID 902), identification information capable of identifying a source code on which the package is based (for example, the source ID 903), and identification information capable of identifying an instance of the package (for example, the instance ID 901); and a packaging unit that, on the basis of reception of an instruction to package a specified instance from the terminal (for example, the terminal 501) operated by the user, acquires a specified source code associated with the specified instance based on the correspondence relationship information from the first management unit and outputs the specified source code.

Regarding the above-described configuration, the source code associated with the instance is output as the user designates the desired instance to be packaged. Accordingly, the user can, for example, use the output source code; and specifically speaking, the user no longer needs to identify the source code by themselves to acquire it, so that packaging of the instance can be easily performed.

The above-described packaging unit compares a first configuration file (for example, a default Config) which defines an operation of an instance generated from the specified source code, with a second configuration file (for example, the Config 142 at the time of packaging) which defines an operation of the above-described specified instance, extracts a changed value from the first configuration file, reflects the extracted value in the specified source code, and outputs the resultant source code.

According to the above-described configuration, the source code in which the change to the instance is reflected is output, so that, for example, it is possible to save the trouble for the user to reflect the changed content in the source code by themselves and it becomes possible to perform the packaging of the instance more easily and appropriately.

Each of the source codes managed by the above-described first management unit: is a prototype of a configuration file which defines an operation of an instance generated from the above-described source code; and is configured by including prototype information including a fixed value, which is a predetermined value, and a variable for assigning a value (for example, a template file which is the deploy.yaml 207) and variable information including a value to be assigned the above-described variable (for example, a variable file which is the values.yaml 208); and wherein the above-described packaging unit judges whether the extracted value is a value to be assigned to the variable or not; and if it is determined that the extracted value is not the value to be assigned to the variable, the packaging unit adds a variable to assign the extracted value to the prototype information of the specified source code.

According to the above-described configuration, the variable setting is set regarding the changed value, so that, for example, it becomes possible to propose a value(s) which may highly possibly be changed as the variable(s) to the next user.

The above-described packaging unit calculates appearance frequency of a variable identifier used in a target key path for identifying the variable from the source codes managed by the above-described first management unit.

Regarding the above-described configuration, for example, the user can decide the variable identifier by comparing the appearance frequency with the variable identifier and the packaging unit can set the variable identifier with the highest appearance frequency, so that it becomes possible to perform the packaging of the instance more easily and appropriately.

The above-described second configuration file includes an image identifier (for example, "NodeRED:1", the application image ID 604) of an image (for example, the application image 132) of one or more application instances executed as the specified instance; and wherein the above-described packaging unit judges whether any change has been made to the above-described image or not; and if the packaging unit determines that the change has been made to the above-described image, a second management unit (for example, the registry 134) that manages the image determines an image identifier capable of uniquely identifying the changed image, reflects the determined image identifier in the above-described specified source code, and outputs the resultant source code.

Since the image identifier of the changed image is reflected in the source code in the above-described configuration, it is possible to avoid the situation where, for example, the user does not know which part of the source code should be changed or what should be used as the image identifier.

The above-described packaging unit acquires the above-described changed image from the above-described specified execution environment.

According to the above-described configuration, it is possible to, for example, save the trouble for the user to create the changed image.

The above-described packaging unit judges whether or not the above-described specified execution environment includes an interface for acquiring the above-described changed image (for example, an API, an SSH, an agent, or the like for acquiring the image); and if the packaging unit determines that the execution environment does not include the above-described interface, the above-described changed image is created by copying data included in the application instance (for example, the application instance 141) which is in the execution state of the above-described changed image.

According to the above-described configuration, it is possible to, for example, save the trouble for the user to create the changed image.

It is possible to communicate with the third management unit which manages the source code (for example, the user repository 1810) for changing the image of the application instance executed as the above-described specified instance and the above-described packaging unit judges whether or not the above-described specified execution environment includes the interface for acquiring the above-described changed image; and if the packaging unit determines that the execution environment does not include the above-described interface, the above-described changed image is created based on the source code managed by the above-described third management unit.

According to the above-described configuration, it is possible to, for example, save the trouble for the user to create the changed image.

The storage apparatus that stores the transformation rule information which defines whether or not to set the value of the prototype information as a variable (for example, the transformation rule information 542) is provided; and if the above-described packaging unit determines that the extracted value is not a value assigned to the variable, and determines based on the above-described transformation rule information that the extracted value should be the variable, the variable for assigning the extracted value is added to the prototype information of the above-described specified source code.

Since the above-described configuration can set information with a meaning as the variable, it is possible to avoid the situation where, for example, information such as a password which does not need to be set as the variable is accidentally set as the variable.

The storage apparatus that stores the transformation rule information which defines whether to use the value of the configuration file defining the operation of the instance or to use the value of the source code on which the above-mentioned instance is based is provided; and if the above-described packaging unit determines, based on the above-described transformation rule information, to use the value of the above-described second configuration file regarding the extracted value, the extracted value is reflected in the above-described specified source code and the resultant source code is output.

According to the above-described configuration, it is possible to avoid, for example, the situation where values specific to the system, such as an IP address, are accidentally set and the situation where values specific to the user, such as a password, are accidentally set.

The above-mentioned packaging unit displays the result of reflecting the extracted value in the above-mentioned specified source code on the display device.

Since the generated source code is displayed in the above-described configuration, for example, the user can easily check the source code.

Furthermore, regarding the aforementioned configurations, they may be changed, combined, or omitted as necessary within the range not exceeding the gist of the present invention.

REFERENCE SIGNS LIST

100: package system
110: repository
120: CI system
130: marketplace system
140: execution environment
150: packaging support system

The invention claimed is:

1. A packaging support system capable of communicating with a first management unit that manages one or more source codes, and a marketplace system that manages one or more packages created based on one of the source codes and causes a package, regarding which an instruction is issued from a terminal operated by a user, to be available as an instance in a specified execution environment, the packaging support system comprising:
a storage apparatus that stores correspondence relationship information which is associated with identification information capable of identifying a package, identification information capable of identifying a source code on which the package is based, and identification information capable of identifying an instance of the package; and
a packaging unit that, on the basis of reception of an instruction to package a specified instance from the terminal operated by the user, acquires a specified source code associated with the specified instance based on the correspondence relationship information from the first management unit and outputs the specified source code;
wherein the packaging unit compares a first configuration file which defines an operation of an instance generated from the specified source code, with a second configuration file which defines an operation of the specified instance, extracts a changed value from the first configuration file, reflects the extracted value in the specified source code, and outputs the resultant source code;
wherein the second configuration file includes an image identifier of an image of one or more application instances executed as the specified instance; and
wherein the packaging unit judges whether any change has been made to the image or not; and
if the packaging unit determines that the change has been made to the image, a second management unit that manages the image determines an image identifier capable of uniquely identifying the changed image, reflects the determined image identifier in the specified source code, and outputs the resultant source code.

2. The packaging support system according to claim 1, wherein each of the source codes managed by the first management unit: is a prototype of a configuration file which defines an operation of an instance generated from the source code; and
is configured by including prototype information including a fixed value, which is a predetermined value, and a variable for assigning a value, and variable information including a value to be assigned to the variable; and wherein the packaging unit judges whether the extracted value is a value to be assigned to the variable or not; and if it is determined that the extracted value is not the value to be assigned to the variable, the packaging unit adds a variable to assign the extracted value to the prototype information of the specified source code.

3. The packaging support system according to claim 2, wherein the packaging unit calculates appearance frequency of a variable identifier used in a target key path for identifying the variable from the source codes managed by the first management unit.

4. The packaging support system according to claim 1, wherein the packaging unit acquires the changed image from the specified execution environment.

5. The packaging support system according to claim 4, wherein the packaging unit judges whether or not the specified execution environment includes an interface for acquiring the changed image; and if the packaging unit determines that the specified execution environment does not include the interface, it creates the changed image by copying data included in an application instance which is an execution state of the changed image.

6. The packaging support system according to claim 4, wherein the packaging support system is capable of communicating with a third management unit that manages a source code for changing the image of the application instance executed as the specified instance; and wherein the packaging unit judges whether or not the specified execution environment includes an interface for acquiring the changed image; and if the packaging unit determines that the specified execution environment does not include the interface, the changed image is created based on the source code managed by the third management unit.

7. The packaging support system according to claim 2, comprising a storage apparatus that stores transformation rule information which defines whether to set a value of the prototype information as a variable or not, wherein when the packaging unit determines that the extracted value is not a value to be assigned to the variable, and also determines based on the transformation rule information that the extracted value should be set as the variable, the packaging unit adds the variable for assigning the extracted value to the prototype information of the specified source code.

8. The packaging support system according to claim 1, comprising a storage apparatus that stores transformation rule information which defines whether to use a value of a configuration file, which defines an operation of an instance, or to use a value of a source code on which the instance is based, wherein when the packaging unit determines based on the transformation rule information that a value of the second configuration file should be used for the extracted value, the packaging unit reflects the extracted value in the specified source code and outputs the resultant source code.

9. The packaging support system according to claim 1, wherein the packaging unit displays a result of reflecting the extracted value in the specified source code on a display device.

10. A packaging support system capable of communicating with a first management unit that manages one or more source codes, and a marketplace system that manages one or more packages created based on one of the source codes and causes a package, regarding which an instruction is issued from a terminal operated by a user, to be available as an instance in a specified execution environment, the packaging support system comprising:

a storage apparatus that stores correspondence relationship information which is associated with identification information capable of identifying a package, identification information capable of identifying a source code on which the package is based, and identification information capable of identifying an instance of the package; and a computer, wherein the computer:

receives an instruction to package a specified instance from the terminal operated by the user; and acquires a specified source code associated with the specified instance based on the correspondence relationship information from the first management unit and outputs the specified source code;

wherein the computer compares a first configuration file which defines an operation of an instance generated from the specified source code, with a second configuration file which defines an operation of the specified instance, extracts a changed value from the first configuration file, reflects the extracted value in the specified source code, and outputs the resultant source code;

wherein the second configuration file includes an image identifier of an image of one or more application instances executed as the specified instance; and wherein the computer judges whether any change has been made to the image or not; and if the computer determines that the change has been made to the image, a second management unit that manages the image determines an image identifier capable of uniquely identifying the changed image, reflects the determined image identifier in the specified source code, and outputs the resultant source code.

\* \* \* \* \*